US008770241B2

(12) United States Patent
Ebiko et al.

(10) Patent No.: US 8,770,241 B2
(45) Date of Patent: Jul. 8, 2014

(54) PNEUMATIC TIRE WITH TREAD HAVING WAVE SHAPED CIRCUMFERENTIAL GROOVE

(75) Inventors: Masahiro Ebiko, Hiratsuka (JP); Kenichiro Endo, Hiratsuka (JP); Takumi Morito, Kanagawa (JP); Hiroshi Tokizaki, Kanagawa (JP); Hiroyuki Kojima, Kanagawa (JP); Kensuke Saitou, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 152 days.

(21) Appl. No.: 13/118,706

(22) Filed: May 31, 2011

(65) Prior Publication Data

US 2012/0132333 A1   May 31, 2012

(30) Foreign Application Priority Data

Nov. 30, 2010 (JP) ................................. 2010-028578
Dec. 2, 2010 (JP) ................................. 2010-269252

(51) Int. Cl.
| *B60C 11/04* | (2006.01) |
| *B60C 11/13* | (2006.01) |
| *B60C 11/03* | (2006.01) |
| *B60C 13/00* | (2006.01) |

(52) U.S. Cl.
CPC ..... *B60C 11/1392* (2013.04); *B60C 2011/0346* (2013.04); *B60C 11/0304* (2013.04); *B60C 13/001* (2013.04); *B60C 11/1315* (2013.04); *B60C 2011/0381* (2013.04); *Y10S 152/90* (2013.01)
USPC .............. 152/209.8; 152/209.15; 152/209.18; 152/209.24; 152/900

(58) Field of Classification Search
USPC .................. 152/209.8, 209.9, 209.15, 209.18, 152/209.24, 900
See application file for complete search history.

(56) References Cited

U.S. PATENT DOCUMENTS 3,951,193 A  *  4/1976  Yeager ..................... 152/209.21
5,795,415 A  *  8/1998  Campana et al. ........ 152/209.18
(Continued)

FOREIGN PATENT DOCUMENTS

EP         256247 A2 *  2/1988
GB        1549347 A  *  8/1979
(Continued)

OTHER PUBLICATIONS

Machine translation for Japan 2005-112085 (no date).*

(Continued)

*Primary Examiner* — Steven D Maki
(74) *Attorney, Agent, or Firm* — Global IP Counselors, LLP

(57) ABSTRACT

A pneumatic tire includes a plurality of circumferential grooves and a first land portion. The circumferential grooves extend continuously in a tire circumferential direction. The first land portion extends in the tire circumferential direction between a pattern end and one of the circumferential grooves in a shoulder region located outside the circumferential grooves in a tire width direction. The first land portion has first lug grooves extending from the pattern end in the tire width direction and closed without communicating with the circumferential grooves are arranged in the tire circumferential direction. At least one circumferential groove is wave-shaped with a constant groove width in the tire width direction at a tread surface and formed in a wave shape in the circumferential direction at the tread surface and groove bottom. The wave-shaped circumferential groove has a shorter cycle length of waves at the groove bottom than at the tread surface.

22 Claims, 33 Drawing Sheets

(56) References Cited

U.S. PATENT DOCUMENTS

| | | | |
|---|---|---|---|
| 7,597,127 B2* | 10/2009 | Mathews | 152/209.18 |
| 2003/0094227 A1* | 5/2003 | Bettiol et al. | 152/209.18 |
| 2010/0200134 A1 | 8/2010 | Murata | |

FOREIGN PATENT DOCUMENTS

| | | | |
|---|---|---|---|
| JP | 61-178205 A | | 8/1986 |
| JP | 61-291203 A | | 12/1986 |
| JP | 02-179508 A | * | 7/1990 |
| JP | 05-065609 U | * | 8/1993 |
| JP | 07-040712 A | | 2/1995 |
| JP | 09-272311 A | * | 10/1997 |
| JP | 2001-187518 A | | 7/2001 |
| JP | 2001-187519 A | | 7/2001 |
| JP | 2005-001550 A | | 1/2005 |
| JP | 2005-112085 A | * | 4/2005 |
| JP | 2006-151029 A | | 6/2006 |
| JP | 2009-040156 A | | 2/2009 |
| WO | WO-2009/020077 A1 | | 2/2009 |

OTHER PUBLICATIONS

Machine translation for Japan 05-065609 (no date).*
Machine translation for Japan 09-272311 (no date).*
Translation for Japan 02-179508 (no date).*
Decision to Grant a Patent corresponding Japanese Patent Application No. 2010-269252, dated Jul. 12, 2011.

* cited by examiner

Table 1-1

|  |  | Related-art example 1 | Related-art example 2 | Related-art example 3 | Comparative example 1 | Comparative example 2 | Comparative example 3 | Comparative example 4 |
|---|---|---|---|---|---|---|---|---|
| Groove 12 | Groove center position from CL (mm) | -30 | -30 | -30 | -30 | -30 | -30 | -30 |
|  | Surface shape | Wave | Wave | Straight | Wave | Wave | Wave | Straight |
|  | Groove bottom shape | Wave | Straight | Wave | Wave | Wave | Wave | Straight |
|  | Tire circumference length (mm) | 1988 | 1988 | 1988 | 1988 | 1988 | 1988 | 1988 |
|  | Groove depth (mm) | 8 | 8 | 8 | 8 | 8 | 8 | 8 |
|  | Chamfer depth (mm) | 1.0 | 1.0 | 1.0 | 1.0 | 1.0 | 1.0 | 1.0 |
|  | Chamfer width (mm) | 1.0 | 1.0 | 1.0 | 1.0 | 1.0 | 1.0 | 1.0 |
|  | Initial wave cycle length (mm) | 30 | 30 | – | 30 | 30 | 30 | – |
|  | Initial wave cycle length / tire circumference length (%) | 1.5 | 1.5 | – | 1.5 | 1.5 | 1.5 | – |
|  | Groove width at tread surface (mm) | 10.0 | 10.0 | 10.0 | 10.0 | 10.0 | 10.0 | 10.0 |
|  | Amplitude at tread surface (mm) | 2.0 | 2.0 | – | 2.0 | 2.0 | 2.0 | – |
|  | Amplitude at tread surface/groove width ratio (%) | 20 | 20 | – | 20 | 20 | 20 | – |
|  | Groove bottom wave cycle length (mm) | 30 | – | 30 | 30 | 30 | 30 | – |
|  | Groove bottom wave cycle length /initial wave cycle length ratio (%) | 100 | – | – | 100 | 100 | 100 | – |
|  | Groove width at groove bottom (mm) | 7.0 | 7.0 | 7.0 | 7.0 | 7.0 | 7.0 | 7.0 |
|  | See-through width at groove bottom (mm) | 5.0 | 7.0 | 5.0 | 5.0 | 5.0 | 5.0 | 7.0 |
|  | See-through width /groove width at groove bottom(%) | 71 | 100 | 71 | 71 | 71 | 71 | 100 |
|  | Groove width | Constant | Constant | Constant | Constant | Constant | Not constant | Constant |

FIG.10A

Table 1-2

| | | Related-art example 1 | Related-art example 2 | Related-art example 3 | Comparative example 1 | Comparative example 2 | Comparative example 3 | Comparative example 4 |
|---|---|---|---|---|---|---|---|---|
| Groove 14 | Groove center position from CL (mm) | 0 | 0 | 0 | 0 | 0 | 0 | 0 |
| | Surface shape | Wave | Wave | Straight | Wave | Wave | Wave | Straight |
| | Groove bottom shape | Wave | Straight | Wave | Wave | Wave | Wave | Straight |
| | Groove depth (mm) | 8 | 8 | 8 | 8 | 8 | 8 | 8 |
| | Chamfer depth (mm) | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 |
| | Initial wave cycle length (mm) | 30 | 30 | – | 30 | 30 | 30 | – |
| | Initial wave cycle length/tire circumference length (%) | 1.5 | 1.5 | – | 1.5 | 1.5 | 1.5 | – |
| | Groove width at tread surface (mm) | 10.0 | 10.0 | 10.0 | 10.0 | 10.0 | 10.0 | 10.0 |
| | Amplitude at tread surface (mm) | 2.0 | 2.0 | – | 2.0 | 2.0 | 2.0 | – |
| | Amplitude at tread surface/groove width ratio (%) | 20 | 20 | – | 20 | 20 | 20 | – |
| | Groove bottom wave cycle length (mm) | 30 | – | 30 | 30 | 30 | 30 | – |
| | Groove bottom wave cycle length/initial wave cycle length ratio (%) | 100 | – | – | 100 | 100 | 100 | – |
| | Groove width at groove bottom (mm) | 7.0 | 7.0 | 7.0 | 7.0 | 7.0 | 7.0 | 7.0 |
| | See-through width at groove bottom (mm) | 5.0 | 7.0 | 5.0 | 5.0 | 5.0 | 5.0 | 7.0 |
| | See-through width/groove width at groove bottom(%) | 71 | 100 | 71 | 71 | 71 | 71 | 100 |
| | Groove width | Constant | Constant | Constant | Constant | Constant | Not constant | Constant |
| | 2nd lug groove opening portion width (mm) | 3.5 | 3.5 | 3.5 | 3.5 | 3.5 | 3.5 | 3.5 |

FIG.10B

Table 1-3

| | | Related-art example 1 | Related-art example 2 | Related-art example 3 | Comparative example 1 | Comparative example 2 | Comparative example 3 | Comparative example 4 |
|---|---|---|---|---|---|---|---|---|
| Groove 16 | Groove center position from CL (mm) | 29 | 29 | 29 | 29 | 29 | 29 | 29 |
| | Surface shape | Wave | Straight | Straight | Straight | Straight | Straight | Straight |
| | Groove bottom shape | Wave | Straight | Straight | Straight | Straight | Straight | Straight |
| | Groove depth (mm) | 8 | 8 | 8 | 8 | 8 | 8 | 8 |
| | Chamfer depth (mm) | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 |
| | Initial wave cycle length (mm) | 30 | – | – | – | – | – | – |
| | Initial wave cycle length/tire circumference length (%) | 1.5 | – | – | – | – | – | – |
| | Groove width at tread surface (mm) | 10.0 | 10.0 | 10.0 | 10.0 | 10.0 | 10.0 | 10.0 |
| | Amplitude at tread surface (mm) | 2 | – | – | – | – | – | – |
| | Amplitude at tread surface/groove width ratio (%) | 20 | – | – | – | – | – | – |
| | Groove bottom wave cycle length (mm) | 30 | – | – | – | – | – | – |
| | Groove bottom wave cycle length/initial wave cycle length ratio (%) | 100 | – | – | – | – | – | – |
| | Groove width at groove bottom (mm) | 7.0 | 7.0 | 7.0 | 7.0 | 7.0 | 7.0 | 7.0 |
| | See-through width at groove bottom (mm) | 5.0 | 7.0 | 7.0 | 7.0 | 7.0 | 7.0 | 7.0 |
| | See-through width /groove width at groove bottom(%) | 71 | 100 | 100 | 100 | 100 | 100 | 100 |
| | Groove width | Constant | Constant | Constant | Constant | Constant | Constant | Constant |
| | 3rd lug groove opening portion width (mm) | 3.5 | 3.5 | 3.5 | 3.5 | 3.5 | 3.5 | 3.5 |

FIG.10C

Table 1-4

| | | Related-art example 1 | Related-art example 2 | Related-art example 3 | Comparative example 1 | Comparative example 2 | Comparative example 3 | Comparative example 4 |
|---|---|---|---|---|---|---|---|---|
| 1st lug groove | Presence or absence of lug groove | Present | Present | Present | Absent | Present | Present | Present |
| | Communication with circumferential groove (Yes or No) | No | No | No | No | Yes | No | No |
| 2nd lug groove | Communication with both circumferential grooves | No | No | No | No | No | No | No |
| | Sound pressure level dB(A) of pass-by noise | Reference | 0.2 | 0.5 | -3.0 | 1.0 | -0.1 | 1.0 |
| | Wet driving stability after wear | 100 | 90 | 105 | 85 | 105 | 98 | 85 |

FIG.10D

Table 2-1

| | | Example 1 | Example 2 | Example 3 | Example 4 | Example 5 | Example 6 | Example 7 | Example 8 | Example 9 |
|---|---|---|---|---|---|---|---|---|---|---|
| Groove 12 | Groove center position from CL (mm) | -37 | -37 | -37 | -37 | -37 | -37 | -37 | -37 | -37 |
| | Surface shape | Wave | Wave | Wave | Wave | Wave | Wave | Wave | Wave | Wave |
| | Groove bottom shape | Wave | Wave | Wave | Wave | Wave | Wave | Wave | Wave | Wave |
| | Tire circumference length (mm) | 1988 | 1988 | 1988 | 1988 | 1988 | 1988 | 1988 | 1988 | 1988 |
| | Groove depth (mm) | 8 | 8 | 8 | 8 | 8 | 8 | 8 | 8 | 8 |
| | Chamfer depth (mm) | 1.0 | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 | 1.0 |
| | Initial wave cycle length (mm) | 30 | 30 | 30 | 30 | 30 | 30 | 30 | 30 | 30 |
| | Initial wave cycle length/tire circumference length (%) | 1.5 | 1.5 | 1.5 | 1.5 | 1.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 | 10.0 |
| | Amplitude at tread surface (mm) | 2.0 | 2.0 | 2.0 | 2.0 | 2.0 | 2.0 | 2.0 | 2.0 | 2.0 |
| | Amplitude at tread surface/groove width ratio (%) | 20 | 20 | 20 | 20 | 20 | 20 | 20 | 20 | 20 |
| | Groove bottom wave cycle length (mm) | 15 | 3 | 6 | 24 | 27 | 15 | 15 | 15 | 15 |
| | Groove bottom wave cycle length/initial wave cycle length ratio (%) | 50 | 10 | 20 | 80 | 90 | 50 | 50 | 50 | 50 |
| | See-through width at groove bottom (mm) | 7 | 7 | 7 | 7 | 7 | 7 | 7 | 7 | 7 |
| | See-through width at groove bottom (mm) | 5 | 5 | 5 | 5 | 5 | 0.5 | 1.4 | 5.6 | 6 |
| | See-through width / groove width at groove bottom(%) | 71 | 71 | 71 | 71 | 71 | 7 | 20 | 80 | 86 |
| | Groove width | Constant | Constant | Constant | Constant | Constant | Constant | Constant | Constant | Constant |

FIG.11A

Table 2-2

| | | Example 1 | Example 2 | Example 3 | Example 4 | Example 5 | Example 6 | Example 7 | Example 8 | Example 9 |
|---|---|---|---|---|---|---|---|---|---|---|
| Groove 14 | Groove center position from CL (mm) | -7 | -7 | -7 | -7 | -7 | -7 | -7 | -7 | -7 |
| | Surface shape | Wave | Wave | Wave | Wave | Wave | Wave | Wave | Wave | Wave |
| | Groove bottom shape | Wave | Wave | Wave | Wave | Wave | Wave | Wave | Wave | Wave |
| | Groove depth (mm) | 8 | 8 | 8 | 8 | 8 | 8 | 8 | 8 | 8 |
| | Chamfer depth (mm) | 1.0 | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 | 1.0 |
| | Initial wave cycle length (mm) | 30 | 30 | 30 | 30 | 30 | 30 | 30 | 30 | 30 |
| | Initial wave cycle length/tire circumference length (%) | 1.5 | 1.5 | 1.5 | 1.5 | 1.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 | 10.0 |
| | Amplitude at tread surface (mm) | 2.0 | 2.0 | 2.0 | 2.0 | 2.0 | 2.0 | 2.0 | 2.0 | 2.0 |
| | Amplitude at tread surface/groove width ratio (%) | 20 | 20 | 20 | 20 | 20 | 20 | 20 | 20 | 20 |
| | Groove bottom wave cycle length (mm) | 15 | 3 | 6 | 24 | 27 | 15 | 15 | 15 | 15 |
| | Groove bottom wave cycle length/initial wave cycle length ratio (%) | 50 | 10 | 20 | 80 | 90 | 50 | 50 | 50 | 50 |
| | Groove width at groove bottom (mm) | 7 | 7 | 7 | 7 | 7 | 7 | 7 | 7 | 7 |
| | See-through width at groove bottom (mm) | 5 | 5 | 5 | 5 | 5 | 0.5 | 1.4 | 5.6 | 6 |
| | See-through width /groove width at groove bottom(%) | 71 | 71 | 71 | 71 | 71 | 7 | 20 | 80 | 86 |
| | Groove width | Constant | Constant | Constant | Constant | Constant | Constant | Constant | Constant | Constant |
| | 2nd lug groove opening portion width (mm) | 3.5 | 3.5 | 3.5 | 3.5 | 3.5 | 3.5 | 3.5 | 3.5 | 3.5 |

FIG.11B

Table 2-3

| | | Example 1 | Example 2 | Example 3 | Example 4 | Example 5 | Example 6 | Example 7 | Example 8 | Example 9 |
|---|---|---|---|---|---|---|---|---|---|---|
| Groove 16 | Groove center position from CL (mm) | 29 | 29 | 29 | 29 | 29 | 29 | 29 | 29 | 29 |
| | Surface shape | Straight | Straight | Straight | Straight | Straight | Straight | Straight | Straight | Straight |
| | Groove bottom shape | Straight | Straight | Straight | Straight | Straight | Straight | Straight | Straight | Straight |
| | Groove depth (mm) | 8 | 8 | 8 | 8 | 8 | 8 | 8 | 8 | 8 |
| | Chamfer depth (mm) | 1.0 | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 | 1.0 |
| | Initial wave cycle length (mm) | – | – | – | – | – | – | – | – | – |
| | Initial wave cycle length/tire circumference length (%) | – | – | – | – | – | – | – | – | – |
| | Groove width at tread surface (mm) | 10 | 10 | 10 | 10 | 10 | 10 | 10 | 10 | 10 |
| | Amplitude at tread surface (mm) | – | – | – | – | – | – | – | – | – |
| | Amplitude at tread surface/groove width ratio (%) | – | – | – | – | – | – | – | – | – |
| | Groove bottom wave cycle length (mm) | – | – | – | – | – | – | – | – | – |
| | Groove bottom wave cycle length/initial wave cycle length ratio (%) | – | – | – | – | – | – | – | – | – |
| | Groove width at groove bottom (mm) | 7 | 7 | 7 | 7 | 7 | 7 | 7 | 7 | 7 |
| | See-through width at groove bottom (mm) | 7 | 7 | 7 | 7 | 7 | 7 | 7 | 7 | 7 |
| | See-through width /groove width at groove bottom(%) | 100 | 100 | 100 | 100 | 100 | 100 | 100 | 100 | 100 |
| | Groove width | Constant | Constant | Constant | Constant | Constant | Constant | Constant | Constant | Constant |
| | 3rd lug groove opening portion width (mm) | 3.5 | 3.5 | 3.5 | 3.5 | 3.5 | 3.5 | 3.5 | 3.5 | 3.5 |

FIG.11C

Table 2-4

| | | Example 1 | Example 2 | Example 3 | Example 4 | Example 5 | Example 6 | Example 7 | Example 8 | Example 9 |
|---|---|---|---|---|---|---|---|---|---|---|
| 1st lug groove | Presence or absence of lug groove | Present | Present | Present | Present | Present | Present | Present | Present | Present |
| | Communication with circumferential groove (Yes or No) | No | No | No | No | No | No | No | No | No |
| 2nd lug groove | Communication with both circumferential grooves (Yes or No) | No | No | No | No | No | No | No | No | No |
| | Sound pressure level dB(A) of pass-by noise | -2.0 | -1.0 | -1.5 | -1.0 | -0.5 | -3.0 | -2.5 | -1.0 | -0.4 |
| | Wet driving stability after wear | 108 | 116 | 120 | 105 | 104 | 103 | 107 | 109 | 110 |

FIG.11D

Table 3-1

| | | Example 10 | Example 11 | Example 12 | Example 13 | Example 14 | Example 15 | Example 16 | Example 17 |
|---|---|---|---|---|---|---|---|---|---|
| Griive 12 | Groove center position from CL (mm) | -37 | -37 | -37 | -37 | -37 | -37 | -37 | -37 |
| | Surface shape | Wave | Wave | Wave | Wave | Wave | Wave | Wave | Wave |
| | Groove bottom shape | Wave | Wave | Wave | Wave | Wave | Wave | Wave | Wave |
| | Tire circumference length (mm) | 1988 | 1988 | 1988 | 1988 | 1988 | 1988 | 1988 | 1988 |
| | Groove depth (mm) | 8 | 8 | 8 | 8 | 4 | 6 | 12 | 16 |
| | Chamfer depth (mm) | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 |
| | Initial wave cycle length (mm) | 10 | 24 | 34 | 70 | 30 | 30 | 30 | 30 |
| | Initial wave cycle length/tire circumference length (%) | 0.5 | 1.2 | 1.7 | 3.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 |
| | Amplitude at tread surface (mm) | 2.0 | 2.0 | 2.0 | 2.0 | 2.0 | 2.0 | 2.0 | 2.0 |
| | Amplitude at tread surface/groove width ratio (%) | 20 | 20 | 20 | 20 | 20 | 20 | 20 | 20 |
| | Groove bottom wave cycle length (mm) | 5 | 12 | 17 | 35 | 15 | 15 | 15 | 15 |
| | Groove bottom wave cycle length/initial wave cycle length ratio (%) | 50 | 50 | 50 | 50 | 50 | 50 | 50 | 50 |
| | Groove width at groove bottom (mm) | 7 | 7 | 7 | 7 | 7 | 7 | 7 | 7 |
| | See-through width at groove bottom (mm) | 5 | 5 | 5 | 5 | 5 | 5 | 5 | 5 |
| | See-through width/groove width at groove bottom(%) | 71 | 71 | 71 | 71 | 71 | 71 | 71 | 71 |
| | Groove width | Constant | Constant | Constant | Constant | Constant | Constant | Constant | Constant |

FIG.12A

Table 3-2

| | | Example 10 | Example 11 | Example 12 | Example 13 | Example 14 | Example 15 | Example 16 | Example 17 |
|---|---|---|---|---|---|---|---|---|---|
| Groove 14 | Groove center position from CL (mm) | -7 | -7 | -7 | -7 | -7 | -7 | -7 | -7 |
| | Surface shape | Wave | Wave | Wave | Wave | Wave | Wave | Wave | Wave |
| | Groove bottom shape | Wave | Wave | Wave | Wave | Wave | Wave | Wave | Wave |
| | Groove depth (mm) | 8 | 8 | 8 | 8 | 4 | 6 | 12 | 16 |
| | Chamfer depth (mm) | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 |
| | Initial wave cycle length (mm) | 10 | 24 | 34 | 70 | 30 | 30 | 30 | 30 |
| | Initial wave cycle length/tire circumference length (%) | 0.5 | 1.2 | 1.7 | 3.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 |
| | Amplitude at tread surface (mm) | 2.0 | 2.0 | 2.0 | 2.0 | 2.0 | 2.0 | 2.0 | 2.0 |
| | Amplitude at tread surface/groove width ratio (%) | 20 | 20 | 20 | 20 | 20 | 20 | 20 | 20 |
| | Groove bottom wave cycle length (mm) | 5 | 12 | 17 | 35 | 15 | 15 | 15 | 15 |
| | Groove bottom wave cycle length/initial wave cycle length ratio (%) | 50 | 50 | 50 | 50 | 50 | 50 | 50 | 50 |
| | Groove width at groove bottom (mm) | 7 | 7 | 7 | 7 | 7 | 7 | 7 | 7 |
| | See-through width at groove bottom (mm) | 5 | 5 | 5 | 5 | 5 | 5 | 5 | 5 |
| | See-through width /groove width at groove bottom(%) | 71 | 71 | 71 | 71 | 71 | 71 | 71 | 71 |
| | Groove width | Constant | Constant | Constant | Constant | Constant | Constant | Constant | Constant |
| | 2nd lug groove opening portion width (mm) | 3.5 | 3.5 | 3.5 | 3.5 | 3.5 | 3.5 | 3.5 | 3.5 |

FIG.12B

Table 3-3

| | | Example 10 | Example 11 | Example 12 | Example 13 | Example 14 | Example 15 | Example 16 | Example 17 |
|---|---|---|---|---|---|---|---|---|---|
| Groove 16 | Groove center position from CL (mm) | 29 | 29 | 29 | 29 | 29 | 29 | 29 | 29 |
| | Surface shape | Straight | Straight | Straight | Straight | Straight | Straight | Straight | Straight |
| | Groove bottom shape | Straight | Straight | Straight | Straight | Straight | Straight | Straight | Straight |
| | Groove depth (mm) | 8 | 8 | 8 | 8 | 4 | 6 | 12 | 16 |
| | Chamfer depth (mm) | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 |
| | Initial wave cycle length (mm) | – | – | – | – | – | – | – | – |
| | Initial wave cycle length/tire circumference length (%) | – | – | – | – | – | – | – | – |
| | Groove width at tread surface (mm) | 10 | 10 | 10 | 10 | 10 | 10 | 10 | 10 |
| | Amplitude at tread surface (mm) | – | – | – | – | – | – | – | – |
| | Amplitude at tread surface/groove width ratio (%) | – | – | – | – | – | – | – | – |
| | Groove bottom wave cycle length (mm) | – | – | – | – | – | – | – | – |
| | Groove bottom wave cycle length/initial wave cycle length ratio (%) | – | – | – | – | – | – | – | – |
| | Groove width at groove bottom (mm) | 7 | 7 | 7 | 7 | 7 | 7 | 7 | 7 |
| | See-through width at groove bottom (mm) | 7 | 7 | 7 | 7 | 7 | 7 | 7 | 7 |
| | See-through width / groove width at groove bottom(%) | 100 | 100 | 100 | 100 | 100 | 100 | 100 | 100 |
| | Groove width | Constant | Constant | Constant | Constant | Constant | Constant | Constant | Constant |
| | 3rd lug groove opening portion width (mm) | 3.5 | 3.5 | 3.5 | 3.5 | 3.5 | 3.5 | 3.5 | 3.5 |

FIG.12C

Table 3-4

| | | Example 10 | Example 11 | Example 12 | Example 13 | Example 14 | Example 15 | Example 16 | Example 17 |
|---|---|---|---|---|---|---|---|---|---|
| 1st lug groove | Presence or absence of lug groove | Present | Present | Present | Present | Present | Present | Present | Present |
| | Communication with circumferential groove (Yes or No) | No | No | No | No | No | No | No | No |
| 2nd lug groove | Communication with both circumferential grooves (Yes or No) | No | No | No | No | No | No | No | No |
| | Sound pressure level dB(A) of pass-by noise | -0.5 | -2.0 | -2.0 | -1.0 | -2.5 | -2.2 | 0.0 | 0.3 |
| | Wet driving stability after wear | 116 | 110 | 107 | 103 | 108 | 108 | 108 | 108 |

FIG.12D

Table 4-1

| | | Example 18 | Example 19 | Example 20 | Example 21 | Example 22 | Example 23 | Example 24 | Example 25 |
|---|---|---|---|---|---|---|---|---|---|
| Groove 12 | Groove center position from CL (mm) | -37 | -37 | -37 | -37 | -37 | -37 | -37 | -37 |
| | Surface shape | Wave | Wave | Wave | Wave | Wave | Wave | Wave | Wave |
| | Groove bottom shape | Wave | Wave | Wave | Wave | Wave | Wave | Wave | Wave |
| | Tire circumference length (mm) | 1988 | 1988 | 1988 | 1988 | 1988 | 1988 | 1988 | 1988 |
| | Groove depth (mm) | 8 | 8 | 8 | 8 | 8 | 8 | 8 | 8 |
| | Chamfer depth (mm) | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 |
| | Initial wave cycle length (mm) | 30 | 30 | 30 | 30 | 30 | 30 | 30 | 30 |
| | Initial wave cycle length/tire circumference length (%) | 1.5 | 1.5 | 1.5 | 1.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 |
| | Amplitude at tread surface (mm) | 0.5 | 1.0 | 2.0 | 3.0 | 2.0 | 2.0 | 2.0 | 2.0 |
| | Amplitude at tread surface/groove width ratio (%) | 5 | 10 | 20 | 30 | 20 | 20 | 20 | 20 |
| | Groove bottom wave cycle length (mm) | 15 | 15 | 15 | 15 | 15 | 15 | 15 | 15 |
| | Groove bottom wave cycle length/initial wave cycle length ratio (%) | 50 | 50 | 50 | 50 | 50 | 50 | 50 | 50 |
| | Groove width at groove bottom (mm) | 7 | 7 | 7 | 7 | 7 | 7 | 7 | 7 |
| | See-through width at groove bottom (mm) | 5 | 5 | 5 | 5 | 5 | 5 | 5 | 5 |
| | See-through width /groove width at groove bottom(%) | 71 | 71 | 71 | 71 | 71 | 71 | 71 | 71 |
| | Groove width | Constant | Constant | Constant | Constant | Constant | Constant | Constant | Constant |

FIG.13A

Table 4-2

| | | Example 18 | Example 19 | Example 20 | Example 21 | Example 22 | Example 23 | Example 24 | Example 25 |
|---|---|---|---|---|---|---|---|---|---|
| Groove 14 | Groove center position from CL (mm) | -7 | -7 | -7 | -7 | -7 | -7 | -7 | -7 |
| | Surface shape | Wave | Wave | Wave | Wave | Wave | Wave | Wave | Wave |
| | Groove bottom shape | Wave | Wave | Wave | Wave | Wave | Wave | Wave | Wave |
| | Groove depth (mm) | 8 | 8 | 8 | 8 | 8 | 8 | 8 | 8 |
| | Chamfer depth (mm) | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 |
| | Initial wave cycle length (mm) | 30 | 30 | 30 | 30 | 30 | 30 | 30 | 30 |
| | Initial wave cycle length/tire circumference length (%) | 1.5 | 1.5 | 1.5 | 1.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 |
| | Amplitude at tread surface (mm) | 0.5 | 1.0 | 2.0 | 3.0 | 2.0 | 2.0 | 2.0 | 2.0 |
| | Amplitude at tread surface/groove width ratio (%) | 5 | 10 | 20 | 30 | 20 | 20 | 20 | 20 |
| | Groove bottom wave cycle length (mm) | 15 | 15 | 15 | 15 | 15 | 15 | 15 | 15 |
| | Groove bottom wave cycle length/initial wave cycle length ratio (%) | 50 | 50 | 50 | 50 | 50 | 50 | 50 | 50 |
| | Groove width at groove bottom (mm) | 7 | 7 | 7 | 7 | 7 | 7 | 7 | 7 |
| | See-through width at groove bottom (mm) | 5 | 5 | 5 | 5 | 5 | 5 | 5 | 5 |
| | See-through width/groove width at groove bottom(%) | 71 | 71 | 71 | 71 | 71 | 71 | 71 | 71 |
| | Groove width | Constant | Constant | Constant | Constant | Constant | Constant | Constant | Constant |
| | 2nd lug groove opening portion width (mm) | 3.5 | 3.5 | 3.5 | 3.5 | 1.0 | 1.5 | 4.5 | 6.0 |

FIG.13B

Table 4-3

| | | Example 18 | Example 19 | Example 20 | Example 21 | Example 22 | Example 23 | Example 24 | Example 25 |
|---|---|---|---|---|---|---|---|---|---|
| Groove 16 | Groove center position from CL (mm) | 29 | 29 | 29 | 29 | 29 | 29 | 29 | 29 |
| | Surface shape | Straight | Straight | Straight | Straight | Straight | Straight | Straight | Straight |
| | Groove bottom shape | Straight | Straight | Straight | Straight | Straight | Straight | Straight | Straight |
| | Groove depth (mm) | 8 | 8 | 8 | 8 | 8 | 8 | 8 | 8 |
| | Chamfer depth (mm) | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 |
| | Initial wave cycle length (mm) | – | – | – | – | – | – | – | – |
| | Initial wave cycle length/tire circumference length (%) | – | – | – | – | – | – | – | – |
| | Groove width at tread surface (mm) | 10 | 10 | 10 | 10 | 10 | 10 | 10 | 10 |
| | Amplitude at tread surface (mm) | – | – | – | – | – | – | – | – |
| | Amplitude at tread surface/groove width ratio (%) | – | – | – | – | – | – | – | – |
| | Groove bottom wave cycle length (mm) | – | – | – | – | – | – | – | – |
| | Groove bottom wave cycle length/initial wave cycle length ratio (%) | – | – | – | – | – | – | – | – |
| | Groove width at groove bottom (mm) | 7 | 7 | 7 | 7 | 7 | 7 | 7 | 7 |
| | See-through width at groove bottom (mm) | 7 | 7 | 7 | 7 | 7 | 7 | 7 | 7 |
| | See-through width / groove width at groove bottom(%) | 100 | 100 | 100 | 100 | 100 | 100 | 100 | 100 |
| | Groove width | Constant | Constant | Constant | Constant | Constant | Constant | Constant | Constant |
| | 3rd lug groove opening portion width (mm) | 3.5 | 3.5 | 3.5 | 3.5 | 3.5 | 3.5 | 3.5 | 3.5 |

FIG.13C

Table 4-4

| | | Example 18 | Example 19 | Example 20 | Example 21 | Example 22 | Example 23 | Example 24 | Example 25 |
|---|---|---|---|---|---|---|---|---|---|
| 1st lug groove | Presence or absence of lug groove | Present | Present | Present | Present | Present | Present | Present | Present |
| | Communication with circumferential groove (Yes or No) | No | No | No | No | No | No | No | No |
| 2nd lug groove | Communication with both circumferential grooves (Yes or No) | No | No | No | No | No | No | No | No |
| | Sound pressure level dB(A) of pass-by noise | -0.5 | -1.5 | -2.0 | -1.0 | -1.0 | -1.8 | -1.8 | -1.5 |
| | Wet driving stability after wear | 106 | 107 | 108 | 108 | 101 | 104 | 108 | 108 |

FIG.13D

Table 5-1

| | | Example 26 | Example 27 | Example 28 | Example 29 | Example 30 | Example 31 | Example 32 | Example 33 |
|---|---|---|---|---|---|---|---|---|---|
| Groove 12 | Groove center position from CL (mm) | -37 | -37 | -37 | -37 | -37 | -37 | -37 | -37 |
| | Surface shape | Wave | Wave | Wave | Wave | Wave | Wave | Wave | Wave |
| | Groove bottom shape | Wave | Wave | Wave | Wave | Wave | Wave | Wave | Wave |
| | Tire circumference length (mm) | 1988 | 1988 | 1988 | 1988 | 1988 | 1988 | 1988 | 1988 |
| | Groove depth (mm) | 8 | 8 | 8 | 8 | 8 | 8 | 8 | 8 |
| | Chamfer depth (mm) | 0.3 | 0.4 | 1.2 | 1.5 | 1.0 | 1.0 | 1.0 | 1.0 |
| | Chamfer width (mm) | 1.0 | 1.0 | 1.0 | 1.0 | 0.2 | 0.3 | 1.5 | 2.0 |
| | Initial wave cycle length (mm) | 30 | 30 | 30 | 30 | 30 | 30 | 30 | 30 |
| | Initial wave cycle length/tire circumference length (%) | 1.5 | 1.5 | 1.5 | 1.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 |
| | Amplitude at tread surface (mm) | 2.0 | 2.0 | 2.0 | 2.0 | 2.0 | 2.0 | 2.0 | 2.0 |
| | Amplitude at tread surface/groove width ratio (%) | 20 | 20 | 20 | 20 | 20 | 20 | 20 | 20 |
| | Groove bottom wave cycle length (mm) | 15 | 15 | 15 | 15 | 15 | 15 | 15 | 15 |
| | Groove bottom wave cycle length/initial wave cycle length ratio (%) | 50 | 50 | 50 | 50 | 50 | 50 | 50 | 50 |
| | Groove width at groove bottom (mm) | 7 | 7 | 7 | 7 | 7 | 7 | 6 | 5 |
| | See-through width at groove bottom (mm) | 5 | 5 | 5 | 5 | 5 | 5 | 4 | 3 |
| | See-through width / groove width at groove bottom (%) | 71 | 71 | 71 | 71 | 71 | 71 | 67 | 60 |
| | Groove width | Constant | Constant | Constant | Constant | Constant | Constant | Constant | Constant |

FIG.14A

Table 5-2

| | | Example 26 | Example 27 | Example 28 | Example 29 | Example 30 | Example 31 | Example 32 | Example 33 |
|---|---|---|---|---|---|---|---|---|---|
| Groove 14 | Groove center position from CL (mm) | -7 | -7 | -7 | -7 | -7 | -7 | -7 | -7 |
| | Surface shape | Wave | Wave | Wave | Wave | Wave | Wave | Wave | Wave |
| | Groove bottom shape | Wave | Wave | Wave | Wave | Wave | Wave | Wave | Wave |
| | Groove depth (mm) | 8 | 8 | 8 | 8 | 8 | 8 | 8 | 8 |
| | Chamfer depth (mm) | 0.3 | 0.4 | 1.2 | 1.5 | 1.0 | 1.0 | 1.0 | 1.0 |
| | Chamfer width (mm) | 1.0 | 1.0 | 1.0 | 1.0 | 0.2 | 0.3 | 1.5 | 1.0 |
| | Initial wave cycle length (mm) | 30 | 30 | 30 | 30 | 30 | 30 | 30 | 30 |
| | Initial wave cycle length/tire circumference length (%) | 1.5 | 1.5 | 1.5 | 1.5 | 1.5 | 1.5 | 1.5 | 1.5 |
| | Groove width at tread surface (mm) | 10.0 | 10.0 | 10.0 | 10.0 | 10.0 | 10.0 | 10.0 | 10.0 |
| | Amplitude at tread surface (mm) | 2.0 | 2.0 | 2.0 | 2.0 | 2.0 | 2.0 | 2.0 | 2.0 |
| | Amplitude at tread surface/groove width ratio (%) | 20 | 20 | 20 | 20 | 20 | 20 | 20 | 20 |
| | Groove bottom wave cycle length (mm) | 15 | 15 | 15 | 15 | 15 | 15 | 15 | 15 |
| | Groove bottom wave cycle length/initial wave cycle length ratio (%) | 50 | 50 | 50 | 50 | 50 | 50 | 50 | 50 |
| | Groove width at groove bottom (mm) | 7 | 7 | 7 | 7 | 7 | 7 | 6 | 5 |
| | See-through width at groove bottom (mm) | 5 | 5 | 5 | 5 | 5 | 5 | 4 | 3 |
| | See-through width /groove width at groove bottom (%) | 71 | 71 | 71 | 71 | 71 | 71 | 67 | 60 |
| | Groove width | Constant | Constant | Constant | Constant | Constant | Constant | Constant | Constant |
| | 2nd lug groove opening portion width (mm) | 3.5 | 3.5 | 3.5 | 3.5 | 3.5 | 3.5 | 3.5 | 3.5 |

FIG.14B

Table 5-3

| | | Example 26 | Example 27 | Example 28 | Example 29 | Example 30 | Example 31 | Example 32 | Example 33 |
|---|---|---|---|---|---|---|---|---|---|
| Groove 16 | Groove center position from CL (mm) | 29 | 29 | 29 | 29 | 29 | 29 | 29 | 29 |
| | Surface shape | Straight | Straight | Straight | Straight | Straight | Straight | Straight | Straight |
| | Groove bottom shape | Straight | Straight | Straight | Straight | Straight | Straight | Straight | Straight |
| | Groove depth (mm) | 8 | 8 | 8 | 8 | 8 | 8 | 8 | 8 |
| | Chamfer depth (mm) | 1.0 | 1.0 | 1.0 | 1.0 | 1.0 | 1.0 | 1.0 | 1.0 |
| | Chamfer width (mm) | 1.0 | 1.0 | 1.0 | 1.0 | 1.0 | 1.0 | 1.0 | 1.0 |
| | Initial wave cycle length (mm) | – | – | – | – | – | – | – | – |
| | Initial wave cycle length/tire circumference length (%) | – | – | – | – | – | – | – | – |
| | Groove width at tread surface (mm) | 10 | 10 | 10 | 10 | 10 | 10 | 10 | 10 |
| | Amplitude at tread surface (mm) | – | – | – | – | – | – | – | – |
| | Amplitude at tread surface/groove width ratio (%) | – | – | – | – | – | – | – | – |
| | Groove bottom wave cycle length (mm) | – | – | – | – | – | – | – | – |
| | Groove bottom wave cycle length/initial wave cycle length ratio (%) | – | – | – | – | – | – | – | – |
| | Groove width at groove bottom (mm) | 7 | 7 | 7 | 7 | 7 | 7 | 7 | 7 |
| | See-through width at groove bottom (mm) | 7 | 7 | 7 | 7 | 7 | 7 | 7 | 7 |
| | See-through width/groove width at groove bottom (%) | 100 | 100 | 100 | 100 | 100 | 100 | 100 | 100 |
| | Groove width | Constant | Constant | Constant | Constant | Constant | Constant | Constant | Constant |
| | 3rd lug groove opening portion width (mm) | 3.5 | 3.5 | 3.5 | 3.5 | 3.5 | 3.5 | 3.5 | 3.5 |

FIG.14C

Table 5-4

| | | Example 26 | Example 27 | Example 28 | Example 29 | Example 30 | Example 31 | Example 32 | Example 33 |
|---|---|---|---|---|---|---|---|---|---|
| 1st lug groove | Presence or absence of lug groove | Present | Present | Present | Present | Present | Present | Present | Present |
| | Communication with circumferential groove (Yes or No) | No | No | No | No | No | No | No | No |
| Second lug groove | Communication with opposite circumferential grooves (Yes or No) | No | No | No | No | No | No | No | No |
| | Sound pressure level dB(A) of pass-by noise | -1.0 | -1.9 | -1.7 | -1.3 | -1.0 | -1.5 | -2.5 | -2.7 |
| | Wet driving stability after wear | 108 | 108 | 108 | 108 | 108 | 108 | 106 | 105 |

FIG.14D

Table 6-1

| | | Example 34 | Example 35 | Example 36 | Example 37 | Example 38 |
|---|---|---|---|---|---|---|
| Groove 12 | Groove center position from CL (mm) | -37 | 29 | -37 | 22 | -37 |
| | Surface shape | Wave | Wave | Wave | Wave | Wave |
| | Groove bottom shape | Wave | Wave | Wave | Wave | Wave |
| | Tire circumference length (mm) | 1988 | 1988 | 1988 | 1988 | 1988 |
| | Groove depth (mm) | 8 | 8 | 8 | 8 | 8 |
| | Chamfer depth (mm) | 1.0 | 1.0 | 1.0 | 1.0 | 1.0 |
| | Chamfer width (mm) | 1.0 | 1.0 | 1.0 | 1.0 | 1.0 |
| | Initial wave cycle length (mm) | 30 | 30 | 30 | 30 | 30 |
| | Initial wave cycle length/tire circumference length (%) | 1.5 | 1.5 | 1.5 | 1.5 | 1.5 |
| | Groove width at tread surface (mm) | 10.0 | 10.0 | 10.0 | 10.0 | 10.0 |
| | Amplitude at tread surface (mm) | 2.0 | 2.0 | 2.0 | 2.0 | 2.0 |
| | Amplitude at tread surface/groove width ratio (%) | 20 | 20 | 20 | 20 | 20 |
| | Groove bottom wave cycle length (mm) | 15 | 15 | 15 | 15 | 15 |
| | Groove bottom wave cycle length/initial wave cycle length ratio (%) | 50 | 50 | 50 | 50 | 50 |
| | Groove width at groove bottom (mm) | 7 | 7 | 7 | 7 | 7 |
| | See-through width at groove bottom (mm) | 5 | 5 | 5 | 5 | 5 |
| | See-through width/groove width at groove bottom (%) | 71 | 71 | 71 | 71 | 71 |
| | Groove width | Constant | Constant | Constant | Constant | Constant |

FIG.15A

Table 6-2

| | | Example 34 | Example 35 | Example 36 | Example 37 | Example 38 |
|---|---|---|---|---|---|---|
| Groove 14 | Groove center position from CL (mm) | -7 | -7 | -7 | -7 | -7 |
| | Surface shape | Straight | Straight | Wave | Wave | Wave |
| | Groove bottom shape | Straight | Straight | Wave | Wave | Wave |
| | Groove depth (mm) | 8 | 8 | 8 | 8 | 8 |
| | Chamfer depth (mm) | 1.0 | 1.0 | 1.0 | 1.0 | 1.0 |
| | Chamfer width (mm) | 1.0 | 1.0 | 1.0 | 1.0 | 1.0 |
| | Initial wave cycle length (mm) | 30 | 30 | 30 | 30 | 30 |
| | Initial wave cycle length/tire circumference length (%) | — | — | 1.5 | 1.5 | 1.5 |
| | Groove width at tread surface (mm) | 10.0 | 10.0 | 10.0 | 10.0 | 10.0 |
| | Amplitude at tread surface (mm) | — | — | 2.0 | 2.0 | 2.0 |
| | Amplitude at tread surface/groove width ratio (%) | — | — | 20 | 20 | 20 |
| | Groove bottom wave cycle length (mm) | — | — | 15 | 15 | 15 |
| | Groove bottom wave cycle length/initial wave cycle length ratio (%) | — | — | 50 | 50 | 50 |
| | Groove width at groove bottom (mm) | 7 | 7 | 7 | 7 | 7 |
| | See-through width at groove bottom (mm) | 7 | 7 | 5 | 5 | 5 |
| | See-through width/groove width at groove bottom (%) | 100 | 100 | 71 | 71 | 71 |
| | Groove width | Constant | Constant | Constant | Constant | Constant |
| | 2nd lug groove opening portion width (mm) | 3.5 | 3.5 | 3.5 | 3.5 | 3.5 |

FIG.15B

Table 6-3

| | | Example 34 | Example 35 | Example 36 | Example 37 | Example 38 |
|---|---|---|---|---|---|---|
| Groove 16 | Groove center position from CL (mm) | 29 | -37 | 29 | -37 | 29 |
| | Surface shape | Straight | Straight | Straight | Straight | Straight |
| | Groove bottom shape | Straight | Straight | Straight | Straight | Straight |
| | Groove depth (mm) | 8 | 8 | 8 | 8 | 8 |
| | Chamfer depth (mm) | 1.0 | 1.0 | 1.0 | 1.0 | 1.0 |
| | Chamfer width (mm) | 1.0 | 1.0 | 1.0 | 1.0 | 1.0 |
| | Initial wave cycle length (mm) | — | — | — | — | — |
| | Initial wave cycle length/tire circumference length (%) | — | — | — | — | — |
| | Groove width at tread surface (mm) | 10 | 10 | 10 | 10 | 10 |
| | Amplitude at tread surface (mm) | — | — | — | — | — |
| | Amplitude at tread surface/groove width ratio (%) | — | — | — | — | — |
| | Groove bottom wave cycle length (mm) | — | — | — | — | — |
| | Groove bottom wave cycle length/initial wave cycle length ratio (%) | — | — | — | — | — |
| | Groove width at groove bottom (mm) | 7 | 7 | 7 | 7 | 7 |
| | See-through width at groove bottom (mm) | 7 | 7 | 7 | 7 | 7 |
| | See-through width/groove width at groove bottom (%) | 100 | 100 | 100 | 100 | 100 |
| | Groove width | Constant | Constant | Constant | Constant | Constant |
| | 3rd lug groove opening portion width (mm) | 3.5 | 3.5 | 3.5 | 3.5 | 3.5 |

FIG.15C

Table 6-4

| | | Example 34 | Example 35 | Example 36 | Example 37 | Example 38 |
|---|---|---|---|---|---|---|
| 1st lug groove | Presence or absence of lug groove | Present | Present | Present | Present | Present |
| | Communication with circumferential groove (Yes or No) | No | No | No | No | No |
| 2nd lug groove | Communication with opposite circumferential grooves (Yes or No) | No | No | No | No | Yes |
| | Sound pressure level dB(A) of pass-by noise | -1.5 | -1.0 | -2.0 | -1.8 | -1.6 |
| | Wet driving stability after wear | 100 | 100 | 108 | 106 | 109 |

FIG.15D

PNEUMATIC TIRE WITH TREAD HAVING WAVE SHAPED CIRCUMFERENTIAL GROOVE

CROSS-REFERENCE TO RELATED APPLICATIONS

This application claims priority to Japanese Design Application No. JP2010-028578, filed on Nov. 30, 2010 and Japanese Patent Application No. JP2010-269252, filed on Dec. 2, 2010. The entire disclosures of Japanese Design Application No. JP2010-028578 and Japanese Patent Application No. JP2010-269252 are hereby incorporated herein by reference.

BACKGROUND

1. Field of the Invention

The present invention relates to a pneumatic tire. More particularly, the present invention relates to a pneumatic tire whose wet performance and tire noise performance are not reduced or improve when the tire becomes worn.

2. Background Information

Conventionally, there is a known pneumatic tire having a tread pattern including a plurality of straight grooves extending in a tire circumferential direction in order to improve wet performance such as hydroplaning performance during traveling on a wet road. Such a tire can effectively drain out water on the road surface to a rear side of the tire and suppress entry of the water into a tire contact patch to thereby maintain satisfactory wet performance such as hydroplaning performance.

However, during traveling on a dry road, groove widths and groove areas of the straight grooves extending in the circumferential direction rapidly shrink and expand to initial states in the contact patch due to a tire deformation to cause vibration in side walls of the grooves. This vibration makes air vibrate in the circumferential grooves with air cavity resonance, and increases tire noise. Japanese Patent Application Laid-Open No. 7-40712 describes a tire having a tread pattern in which groove widths of circumferential grooves are increased and decreased in a tire width direction to impart operations of silencers to the grooves to cope with this problem.

In the tire described Japanese Patent Application Laid-Open No. 7-40712, when a distance from one lug groove to the adjacent lug groove in the circumferential direction is defined as one pitch which is a minimum unit for forming the pattern of a tread portion, each of the circumferential grooves has a plurality of wide portions having increased groove widths and a plurality of narrow portions having smaller widths within a pitch, and distances between the wide portions or distances between the narrow portions in the circumferential direction are different from each other. With this tire, the noise can be reduced while maintaining wet performance and especially hydroplaning performance as compared with a related tire.

SUMMARY

However, by only increasing and decreasing the groove widths as in the related art, wet braking performance when the tire is worn may decrease substantially in some cases. It is thus an object of the invention to provide a pneumatic tire in which both of wet performance and tire noise performance are not reduced and at least one of them is improved when the tire is worn.

Accordingly, a disclosed embodiment provides a pneumatic tire including a plurality of circumferential grooves extending continuously in a tire circumferential direction; and a first land portion formed between a pattern end and one of the plurality of circumferential grooves in a shoulder region which is located outside the circumferential grooves in a tire width direction. The first land portion extends in the tire circumferential direction. In the first land portion, a plurality of first lug grooves extending from the pattern end in the tire width direction and closed without communicating with the circumferential grooves are arranged in the tire circumferential direction. At least one of the circumferential grooves is a wave-shaped circumferential groove having a constant groove width in the tire width direction at a tread surface, formed in wave shapes in the circumferential direction at the tread surface and at a groove bottom, and having a shorter cycle length of waves at the groove bottom than a cycle length of waves at the tread surface when the tire is new.

The cycle length of the waves at the groove bottom of the wave-shaped circumferential groove preferably ranges 0.2 to 0.8 times the cycle length of the waves at the tread surface. Preferably, the wave-shaped circumferential groove has a see-through portion through which one end of the wave-shaped circumferential groove is visible from an other end of the wave-shaped circumferential groove when the tread surface is developed through a tire circumference on a plane. A width of the see-through portion at the groove bottom of the wave-shaped circumferential groove ranges 20 to 80% the groove width of the wave-shaped circumferential groove at the groove bottom.

Preferably, the cycle length of the waves at the tread surface of the wave-shaped circumferential groove ranges 1.2 to 1.7% a tire circumference length of the pneumatic tire. Preferably, the wave-shaped circumferential groove has a groove depth ranging 6 to 12 mm and amplitude in the tire width direction at the tread surface ranging 10 to 20% of the groove width at the tread surface.

Preferably, the pneumatic tire further includes a second land portion in which a plurality of second lug grooves which open into the wave-shaped circumferential groove are arranged in the tire circumferential direction. Widths of respective opening portions of the second lug grooves ranges 5 to 15% length between adjacent second lug grooves adjacent to each other.

Preferably, groove walls of the wave-shaped circumferential groove have chamfered portions formed by chamfering at the tread surface, and the chamfered portions have depths ranging 5 to 15% of the depth of the circumferential groove and widths ranging 3 to 15% of the groove width of the circumferential groove at the tread surface. Preferably, the wave-shaped circumferential groove is formed in a half tread portion on one side of the pneumatic tire with a reference to the tire center line and the half tread portion is instructed to be put on an inner side of the vehicle when the tire is mounted to the vehicle.

Preferably, there is provided a tread pattern including at least two main grooves extending in the tire circumferential direction, wherein each of the main grooves is the wave-shaped circumferential groove, the main grooves are formed in the half tread portion on one side of the pneumatic tire with a reference to the tire center line when the tire is mounted to the vehicle, and the half tread portion is instructed to be put on an inner side of the vehicle when the tire is mounted to vehicle. Preferably, there is provided a tread pattern including at least two main grooves extending in the tire circumferential direction, wherein each of the main grooves is the wave-shaped circumferential groove, a second land portion formed between the adjacent main grooves and extending in the tire circumferential direction is provided, and a plurality of second lug grooves opening to the wave-shaped circumferential groove at one end thereof and closed at an other end thereof are arrayed in the tire circumferential direction in the second land portion.

In the pneumatic tire according to the above aspect, both of the wet performance and the tire noise performance are not reduced when the tire is worn and at least one of them can be improved.

BRIEF DESCRIPTION OF THE DRAWINGS

Referring now to the attached drawings which form a part of this original disclosure:

FIGS. 10A to 10D indicate specifications and evaluation results of related-art examples and comparative examples;

FIGS. 11A to 11D indicate specifications and evaluation results of examples 1 to 9;

FIGS. 12A to 12D indicate specifications and evaluation results of examples 10 to 17;

FIGS. 13A to 13D indicate specifications and evaluation results of examples 18 to 25;

FIGS. 14A to 14D indicate specifications and evaluation results of examples 26 to 33;

FIGS. 15A to 15D indicate specifications and evaluation results of examples 34 to 38.

DETAILED DESCRIPTION OF EMBODIMENTS

Figure 1:
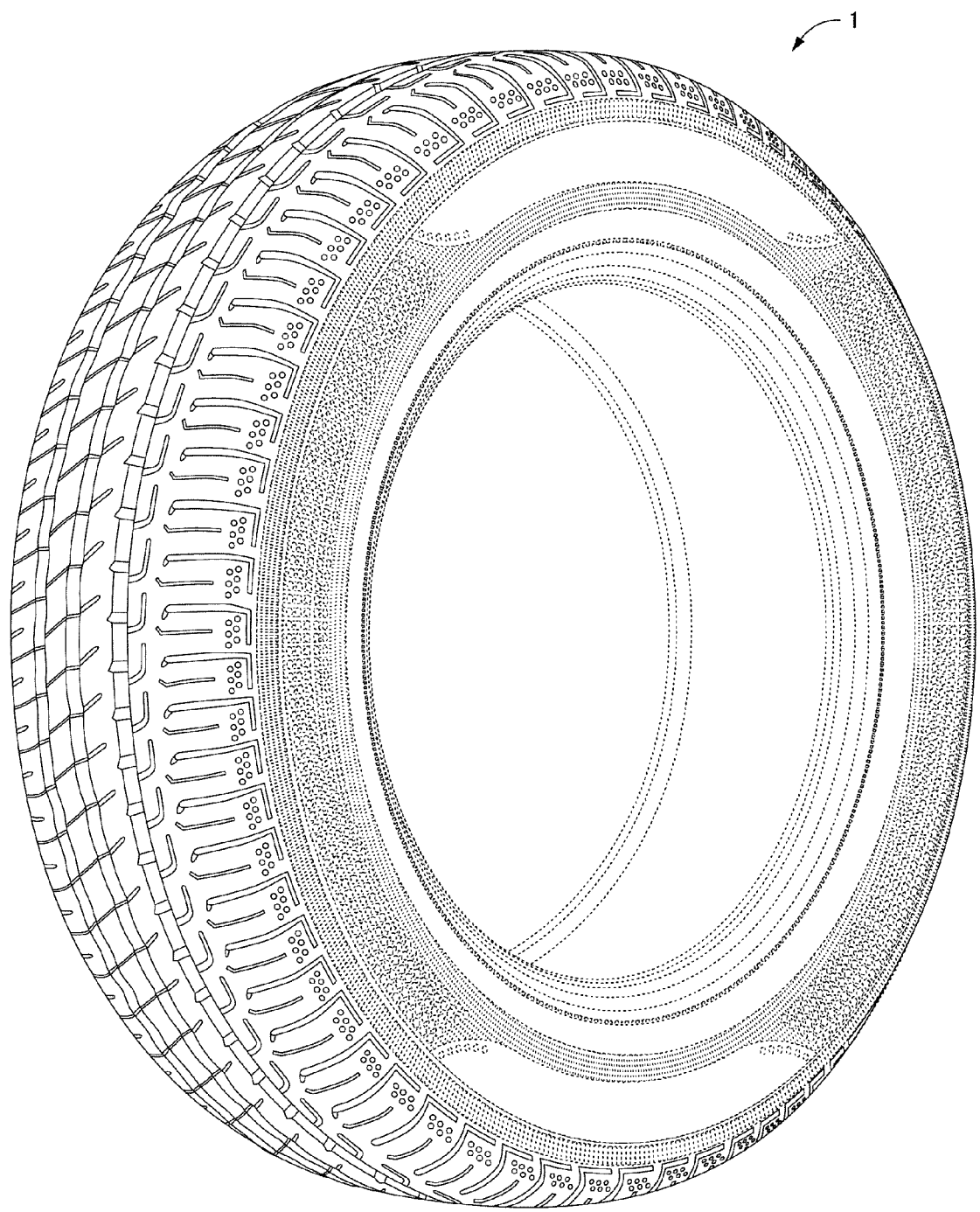
FIG. 1 is a perspective view showing an ornamental design of a pneumatic tire of a disclosed embodiment with parts of the sidewall portions and bead portions being indicated by broken lines.
Figure 2:
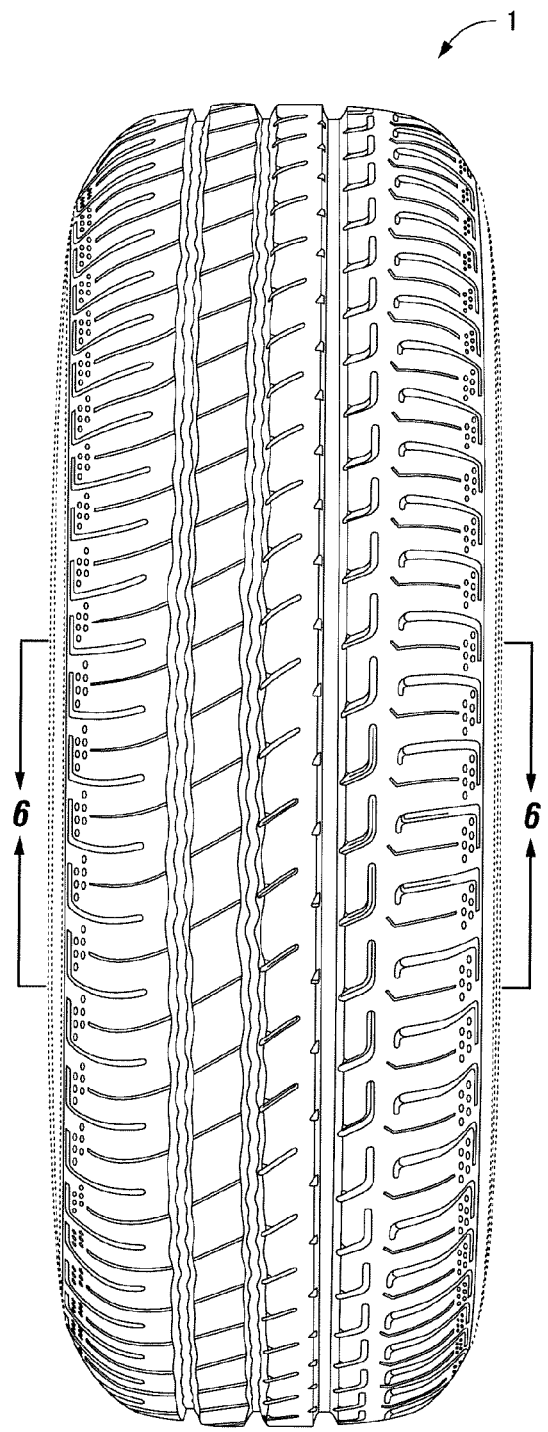
FIG. 2 is a front view of the ornamental design of the pneumatic tire shown in FIG. 1, with a top plan view and bottom plan view of the pneumatic tire appearing the same as the front view.
Figure 3:
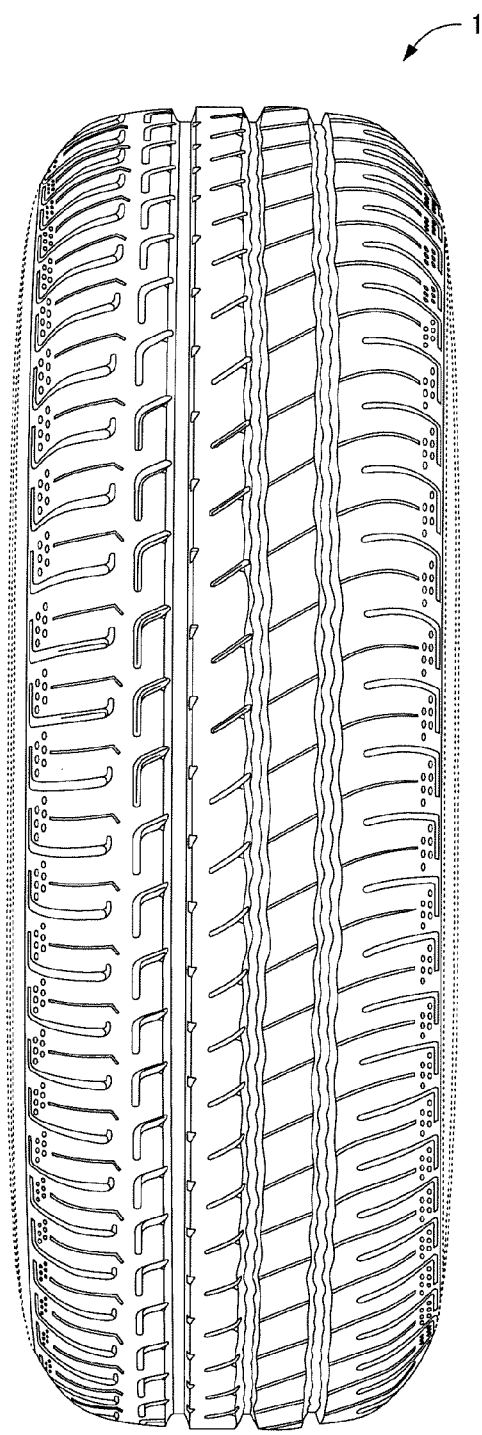
FIG. 3 is a rear view of the ornamental design of the pneumatic tire shown in FIG. 1.
Figure 4:
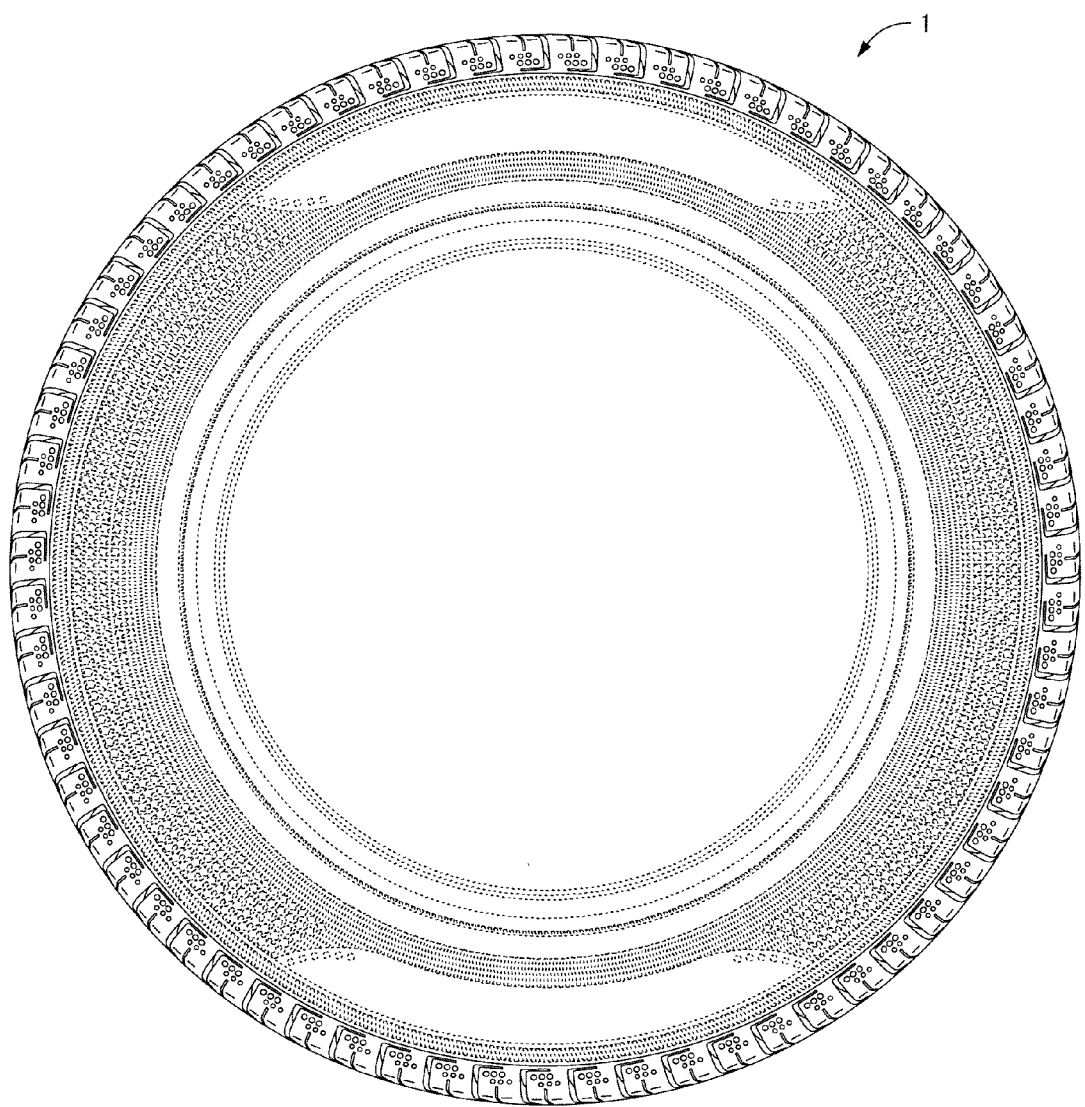
FIG. 4 is a right side view of the ornamental design of the pneumatic tire shown in FIG. 1.
Figure 5:
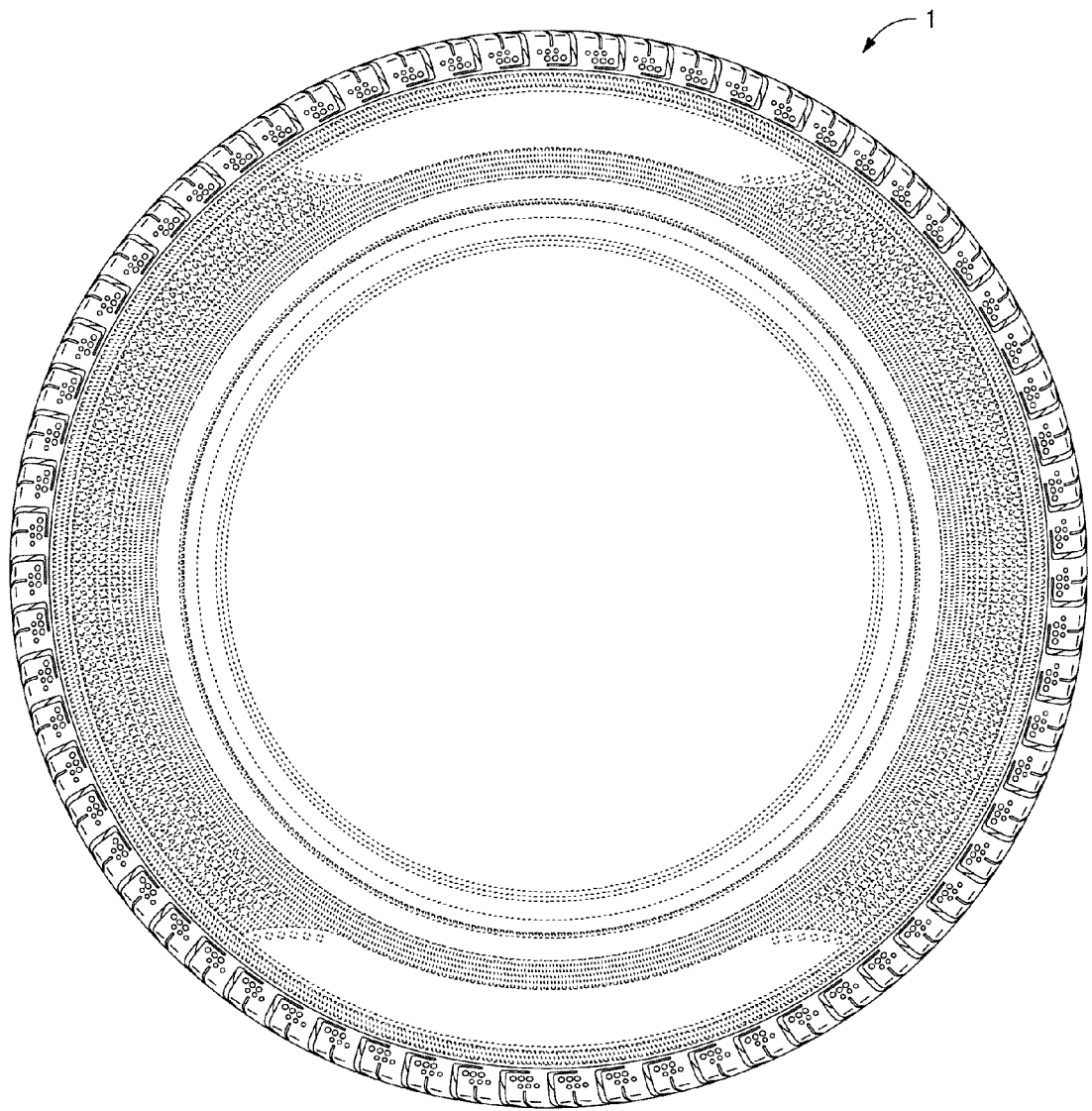
FIG. 5 is a left side view of the ornamental design of the pneumatic tire shown in FIG. 1.
Figure 6:
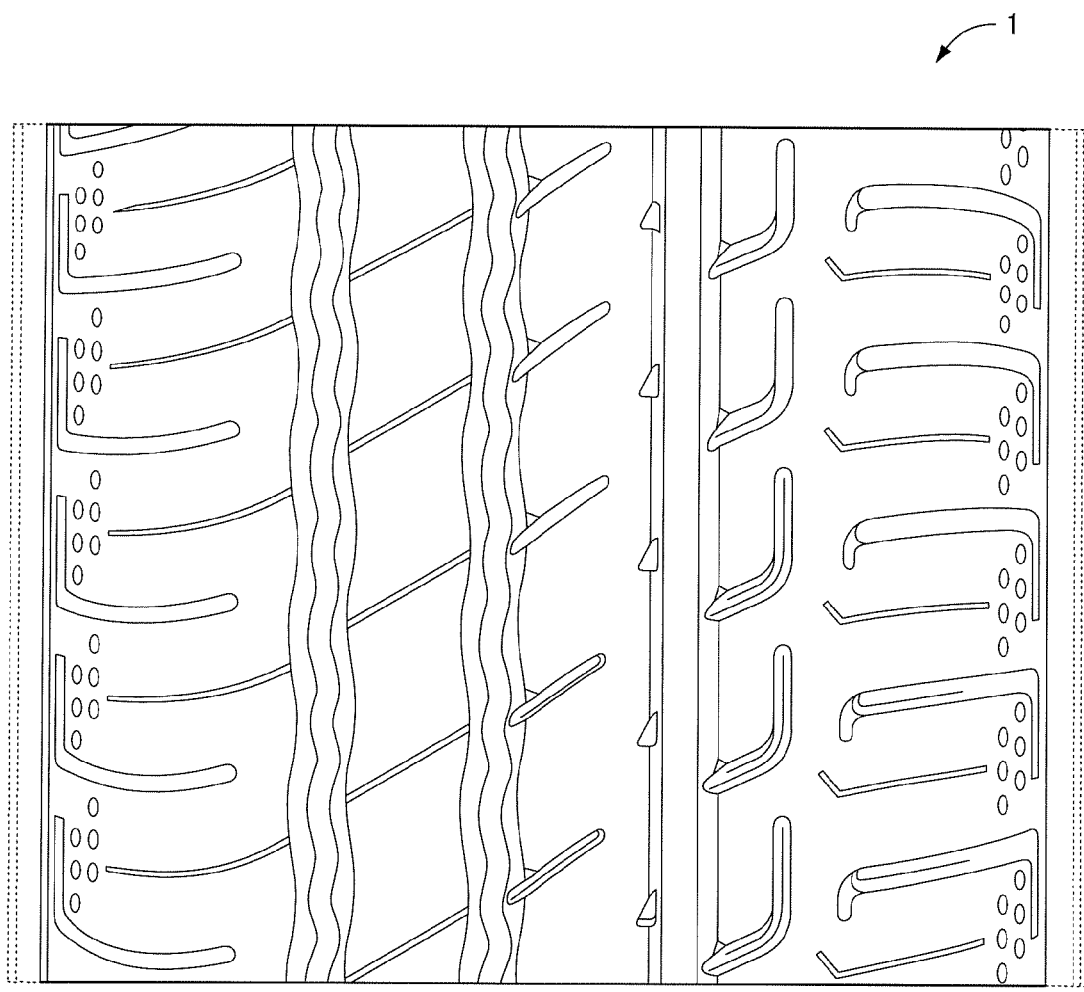
FIG. 6 is partial front view of the ornamental design of the pneumatic tire shown in FIG. 1, showing an enlargement of the portion 19-19 in FIG. 5, with the tread pattern continuously repeating around the circumference of the tire.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

FIGS. 1 to 6 illustrate an ornamental design for the pneumatic tire 1 as described herein. In the case of a partial tire design of the pneumatic tire 1, the broken line illustration of the environmental structure (the remaining structure of the pneumatic tire 1) in the drawings is not part of the claimed design. However, in the case of a full tire design of the pneumatic tire 1, the broken lines can instead be depicted as solid lines to illustrate incorporation of the remaining structure as part of the ornamental design for the pneumatic tire 1.

An embodiment of the pneumatic tire 1 (also referred to herein as a tire) which can be a tire for a passenger car or any other suitable vehicle. Dimensions in the following description is effectively applied mainly to a tire of a tire width of 195 mm and can be applied to a tire of a tire width ranging from 135 to 315 mm.

Figure 7:
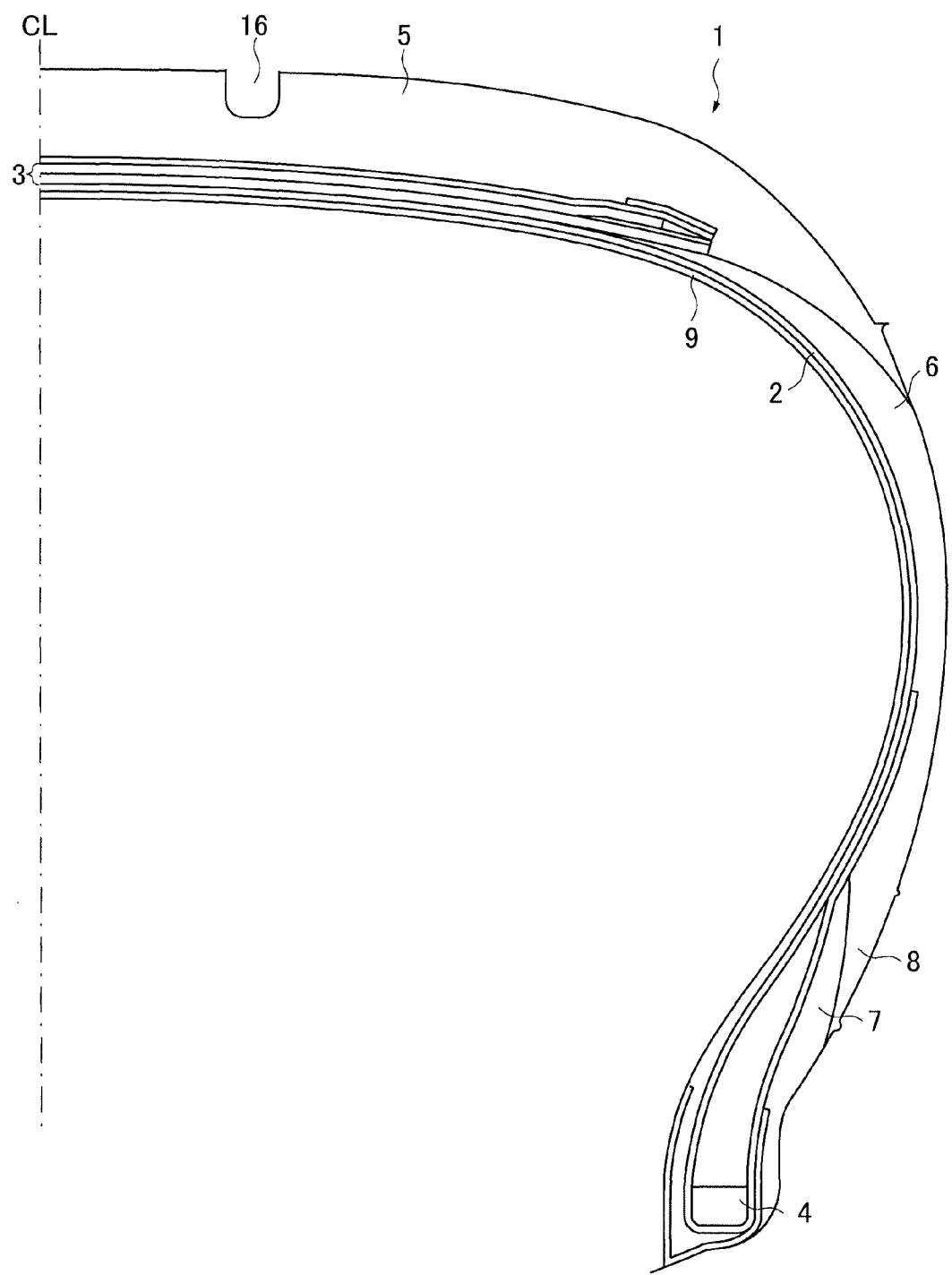
FIG. 7 is a cross sectional view illustrating a right half portion of the pneumatic tire shown in FIG. 1 including features according to a disclosed embodiment.

FIG. 7 is a cross sectional view illustrating a right half portion of the pneumatic tire 1 according to a disclosed embodiment as shown in FIG. 1. The structure and the rubber members of the tire will be described hereinafter but the structure and the rubber members are not limited. Other known tire structure and rubber members or new ones may be employed as a structure and rubber members of the tire 1.

A pneumatic tire 1 of an embodiment includes a carcass ply 2, belts 3 and bead cores 4, as structural core members. Around the structural core members, a tread rubber member 5, side wall rubber members 6, bead filler rubber members 7, rim cushion members 8 and an inner liner rubber member 9 are provided.

In the following description, a tire circumferential direction refers to a direction in which a tread surface of the tire moves when the tire is rotated about a tire rotation axis and a tire width direction refers to a direction parallel to the tire rotation axis. A tire radial direction refers to a direction vertical to the tire rotation axis.

The carcass ply 2 is a core member, in a toroidal shape, having organic cords coated with rubber and arranged between both of annular bead cores 16. Two layers of the belts 3 are provided outside the carcass ply 12 in the tire radial direction. The belts 3 are core members having steel cords coated with rubber. Steel cords of each layer of the belts 3 are arranged to be inclined at a predetermined angle, for example a certain angle ranging 20 degrees to 30 degrees from the tire circumferential direction. A lower layer of the belts 3 is wider in the tire width direction than a upper layer thereof. The inclination directions of the steel cords of the layers are opposites from each other with reference to the tire center line CL, which suppresses an expansion of the carcass ply 2 due to tire inflation pressure.

The tread rubber member 5 is provided outside the belts 3 in the tire radial direction. Each of the side wall rubber members 6 is arranged to be connected to the tread rubber member 5 at an end thereof to form a side wall portion. Each of the rim cushion rubber member 8 is arranged to be connected to the side wall rubber members 6 at an ends thereof to have a contact with a rim on which the tire 1 is mounted to a rim. Each of the bead filler rubber members 7 is arranged to be interposed between an outward turned-up portion of the carcass ply 2 and an inside portion of the carcass ply 2 outside the bead core 4 in the tire radial direction. The inner liner rubber member 9 is arranged on the whole inner surface of the tire 1 to face a tire cavity region filled with inflated air between the tire 1 and the rim. The tire 1 includes belt cover sheets covering the belts 3, which have organic cords coated with rubber. The tire 1 of the embodiment includes two layers of belts 3, however the tire 1 may include three layers or more of the belts 3.

Figure 8:
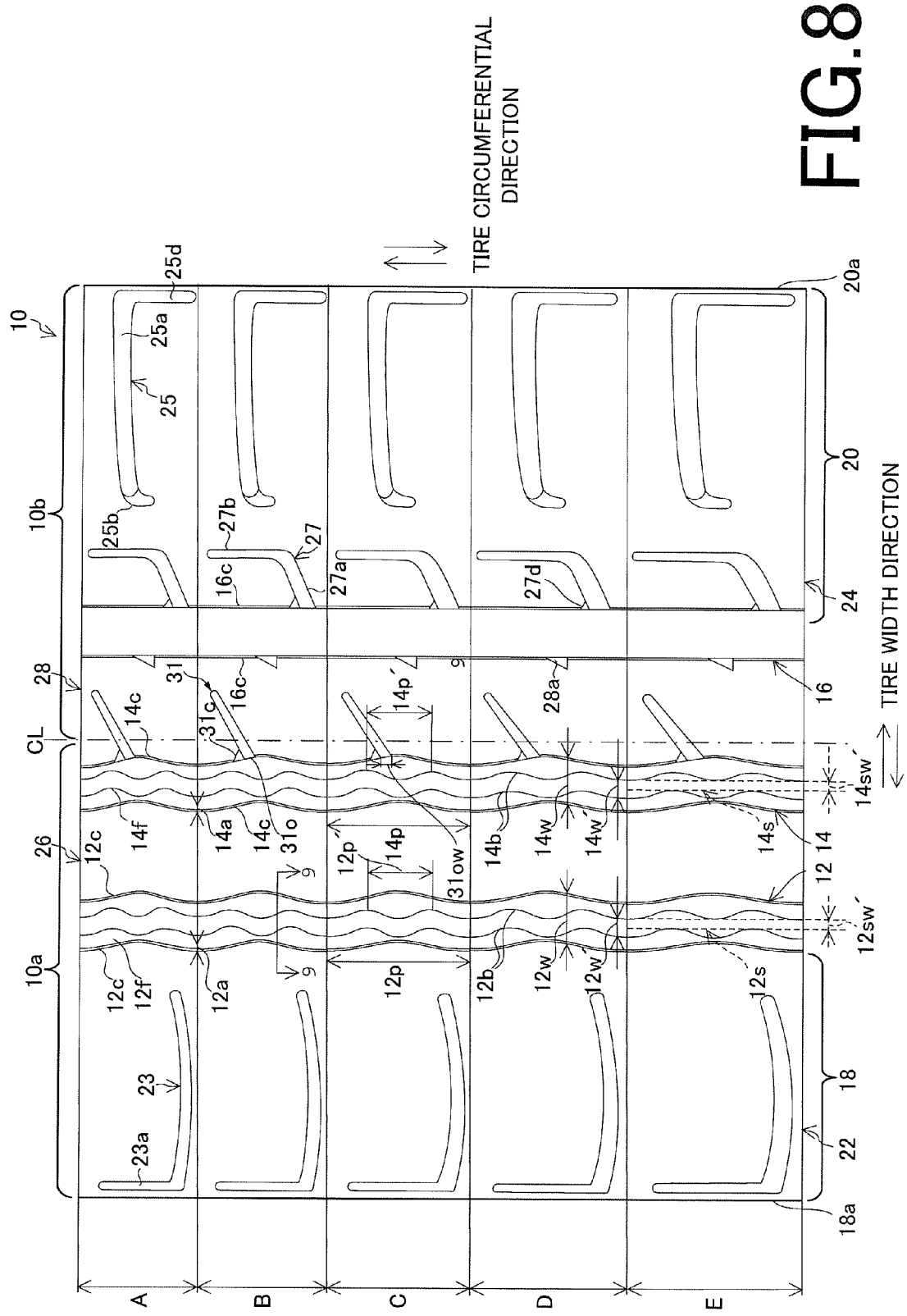
FIG. 8 is a planar developed view illustrating a tread pattern of the tire shown in FIG. 1 when a tire is new.

In the tire 1 with the above described structure, a tread pattern 10 is formed on a tread portion as illustrated in FIG. 8 when the tire is new. FIG. 8 is a planar developed view illustrating the tread pattern 10 of the tire 1 in an easily understood manner.

In FIG. 8, a region between the tire center line CL and a pattern end 18a is a half tread portion 10a which is instructed to be put on an inner side of a vehicle when the tire is mounted to the vehicle. A region between the tire center line CL and a pattern end 20a is a half tread portion 10b which is instructed to be put on an outside of the vehicle when the tire is mounted to the vehicle. The half tread portions 10a and 10b are arranged to face the inner side and the outside of the vehicle, respectively, when the tire is mounted. In the specification, lug grooves are grooves 1.5 mm or greater in width and 5 mm or greater in depth. In the specification, sipes are smaller than 1.5 mm in width.

In the tread pattern 10 illustrated in FIG. 8, five kinds of pitches A to E having different dimensions from each other in tire circumferential dimension are arranged from the pitch A which is the shortest in tire circumferential length in ascending order of the tire circumferential length. In the tire 1, the pitches A to E are arranged in order of pitch length or in random order in the tire circumferential direction to obtain variations in the pitch. At this time, a plurality of pitches which are the same in pitch length can be arranged successively. In the following description, a dimension included in the pitch C will be taken as an example of the tire circumferential dimension.

The tire 1 having the tread pattern 10 can be suitably used as the tire for the passenger car. Dimensions of circumferential grooves and the lug grooves described below are examples of numerical values in the tire for the passenger car. The tread pattern 10 includes three circumferential grooves 12, 14, and 16, first land portions 22 and 24, and second land portions 26 and 28. The three circumferential grooves 12, 14, and 16 extend continuously in the tire circumferential direction. The first land portion 22 is formed in a shoulder region 18 adjacent to the circumferential groove 12, while a first land portion 24 is formed in a shoulder region 20 adjacent to the circumferential groove 16. The second land portion 26 is formed between the circumferential grooves 12 and 14 and extends in the tire circumferential direction. The second land portion 28 is formed between the circumferential grooves 14 and 16 and extends in the tire circumferential direction.

(Circumferential Grooves)

The circumferential grooves 12 and 14 are wave-shaped circumferential grooves and the circumferential groove 16 is a straight circumferential groove extending straight in the tire circumferential direction.

The wave-shaped circumferential grooves 12 and 14 have constant groove widths $12w$ and $14w$ in the tire width direction at a tread surface when the tire is new in order to maintain wet performance when the tire is worn and to improve tire noise performance. For example, the groove widths $12w$ and $14w$ are 6 to 15 mm. In the case where the groove widths between groove walls are increased by chamfered portions $12c$ and $14c$ at the tread surface described later, each of the groove widths $12w$ and $14w$ refers to a distance between widened end portions of the groove walls facing each other in the tire width direction.

Figure 9:
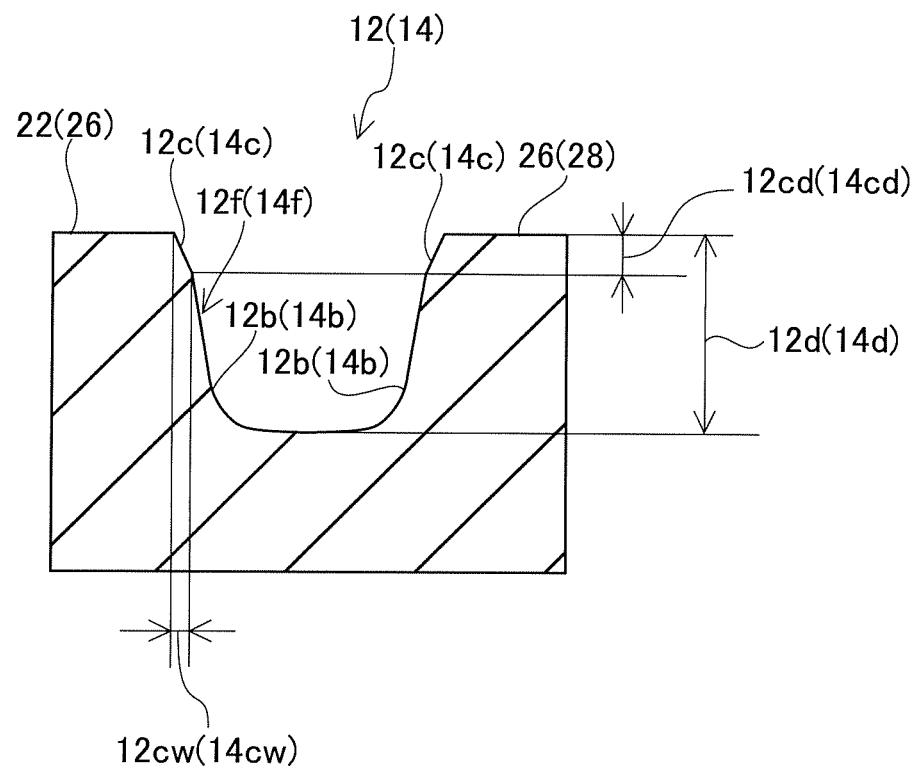
FIG. 9 is a sectional view of a tread pattern viewed in a direction of a line 9-9 in FIG. 8.

The wave-shaped circumferential grooves 12 and 14 are formed in wave shapes in the circumferential direction at the tread surface and at groove bottoms $12b$ and $14b$ respectively when the tire is new. Such wave shapes of the circumferential grooves 12 and 14 effect reduction of tire nose as silencers for air cavity resonance generated in the grooves. As illustrated in FIG. 9, the groove bottoms $12b$ and $14b$ refer to lower ends of groove walls $12f$ and $14f$ (described later) extending from the tread surface to bottom portions in a section profile along a tire radial direction. FIG. 9 is a sectional view of a tread pattern viewed in a direction of a line 9-9 in FIG. 8. The wave-shaped circumferential groove 12 illustrated in FIG. 9 can be replaced with the wave-shaped circumferential groove 14. In this case, instead of respective reference numerals in FIG. 9 reference numerals inside the parentheses shown beside the reference numerals are referred to. Groove widths $12w'$ and $14w'$ of the groove bottoms $12b$ and $14b$ are 1 to 15 mm, for example, and preferably 3 to 10 mm.

Cycle lengths $12p'$ and $14p'$ of the waves at the groove bottoms $12b$ and $14b$ of the wave-shaped circumferential grooves 12 and 14 are shorter than cycle lengths $12p$ and $14p$ of waves at the tread surface when the tire is new. With such groove shapes, generation of the air cavity resonance can be suppressed and the tire noise can be reduced. Moreover, the wave shape with the shorter cycle length appears when the tire is worn, which increases edge components in contact faces and therefore improves handling stability on a wet road. The cycle lengths $12p'$ and $14$-$p'$ of the waves are preferably 0.2 times the cycle lengths $12p$ and $14p$ of the waves at the tread surface or longer from viewpoints of smooth flow of water and improvement of drainage performance. The cycle lengths $12p'$ and $14p'$ of the waves are preferably 0.8 times the cycle length $12p$ and $14p$ or shorter so that phases in the grooves may be out of alignment with each other from a view point of suppressing noise due to the air cavity resonance. Shapes of the wave-shaped circumferential grooves 12 and 14 at the tread surface are preferably formed of smooth curves. In the embodiment, a shape of each of the wave-shaped circumferential grooves 12 and 14 is one cycle of a sine wave extending in the tire circumferential direction at the tread surface and is a shape of two cycles of the sine wave extending in the tire circumferential direction at the groove bottoms $12b$ and $14b$ in each pitch. However, the shape does not necessarily have to be one cycle of the sine wave or two cycles of the sine wave in other embodiments. The shape is not even limited to the sine wave.

The wave-shaped circumferential grooves 12 and 14 have see-through portions $12s$ and $14s$ through which one end can be seen from the other end when the tread surface is developed through a tire circumference on a plane. Because the see-through portions are provided, the drainage performance is improved when the road surface is in a wet condition. Widths $12sw'$ and $14sw'$ of the see-through portions $12s$ and $14s$ at the groove bottoms $12b$ and $14b$ are preferably 20% the groove widths $12w'$ and $14w'$ of the groove bottoms $12b$ and $14b$ or greater and most preferably 30% or greater from a viewpoint of establishing satisfactory drainage performance. The widths $12sw'$ and $14sw'$ are preferably 80% or smaller from a viewpoint of suppressing the noise due to the air cavity resonance. For example, the widths $12sw'$ and $14sw'$ of the see-through portions $12s$ and $14s$ at the groove bottoms $12b$ and $14b$ are 1.4 to 5.6 mm, respectively, in the case where both the groove widths $12w'$ and $14w'$ of the groove bottoms $12b$ and $14b$ are 7 mm.

As the number of cycles of the waves on the circumference increases, edge components increase on the tread surface and a pattern noise caused by the edge components increases. On the other hand, if the number of cycles of the waves on the circumference reduces, noise frequencies may not disperse sufficiently and the noise or the like due to the air cavity resonance may not be sufficiently suppressed. Therefore, preferably, one cycle of the wave is formed in one pitch and the number of pitches included in the tire circumferential direction is 60 to 80. That is, the cycle lengths $12p$ and $14p$ of the waves are preferably 1.2% the tire circumference length or longer and are preferably 1.7% the tire circumference length or shorter from a viewpoint of the effect of reducing the tire noise due to the air cavity resonance. For example, the cycle lengths $12p$ and $14p$ of the waves on the tread surface may be 20 to 60 mm and preferably 24 to 34 mm when the tire circumference length is assumed 1988 mm.

Groove depths 12d and 14d of the wave-shaped circumferential grooves 12 and 14 are preferably 6 mm or greater from a viewpoint of improving the drainage performance in the tire for the passenger car and is preferably 12 mm or smaller from a viewpoint of not reducing block rigidity of the tread to thereby improve handling and stability on a dry road.

Amplitudes 12a and 14a of the wave-shaped circumferential grooves 12 and 14 in the tire width direction at the tread surface are preferably 10% the groove widths 12w and 14w at the tread surface or greater from a viewpoint of reducing the noise due to the air cavity resonance. The amplitudes 12a and 14a are preferably 20% or smaller from a viewpoint of preventing adverse influence of the pattern noise on the tire noise performance by increasing of the edge component. For example, when groove widths of the wave-shaped circumferential grooves 12 and 14 are assumed 10 mm at the tread surface, the amplitudes 12a and 14a may be 1 to 2 mm. Although amplitudes in the tire width direction at the groove bottoms 12b and 14b may be greater or smaller than the amplitudes 12a and 14a at the tread surface, they are preferably smaller than the amplitudes 12a and 14a at the tread surface from viewpoints of the smooth flow of water and improvement of the drainage performance.

The wave-shaped circumferential grooves 12 and 14 have the groove walls 12f and 14f and faces of the groove walls 12f and 14f are chamfered at the tread surface to form the chamfered portions 12c and 14c as illustrated in FIG. 9. Because the chamfered portions 12c and 14c are provided, an area of a contact patch of the tire reduces and, as a result, tire contact pressure increases and driving stability on the wet road can be improved. Depths 12cd and 14cd of the chamfered portions 12c and 14c are preferably 5 to 15% the depths 12d and 14d of the wave-shaped circumferential grooves 12 and 14 from a viewpoint of improving the wet performance when the tire is worn. For example, the depths 12cd and 14cd may be 0.4 to 1.2 mm when the depths of the wave-shaped circumferential grooves 12 and 14 are assumed 8 mm.

Widths 12cw and 14cw of the chamfered portions 12c and 14c are preferably 3% the groove widths 12w and 14w of the wave-shaped circumferential grooves 12 and 14 at the tread surface or greater from a viewpoint of improving the wet performance when the tire is new. The widths 12cw and 14cw are preferably 15% or smaller from a viewpoint of improving the wet performance when the tire is worn. For example, the widths 12cw and 14cw of the chamfered portions 12c and 14c are 0.3 to 1.5 mm when the groove widths of the circumferential grooves 12 and 14 at the tread surface are 10 mm.

Each of the groove walls 12f and 14f of the wave-shaped circumferential grooves 12 and 14 has a face formed by extending, in the tire circumferential direction, a line segment formed between a lower end of the chamfered portion 12c or 14c and the groove bottom 12b or 14b at the same tire circumferential position as the lower end. An area of this face increases from chamfered portion 12c or 14c to the groove bottom 12b or 14b, because the cycle length at the groove bottom is short. In this way, it is possible to effectively suppress generation of the noise due to the air cavity resonance. Because the edge components on the tire contact face increase as the tire is worn, the driving stability on the wet road is improved. Even if second lug grooves 31 (described later) disappear due to the tread wear, the edge components increase to supplement the driving stability on the wet road. The faces of the groove walls 12f and 14f of the wave-shaped circumferential grooves 12 and 14 are preferably inclined outward at 0 to 40° with reference to the tire radial direction from a viewpoint of a tire manufacturing process including a smooth release of the tire out of a tire mold for a tire vulcanization and a viewpoint of a tire performance including the handling and stability on the dry road.

Below each of the groove bottoms 12b and 14b of the wave-shaped circumferential grooves 12 and 14, a recessed portion region recessed inward in the tire radial direction is formed as illustrated in FIG. 9. Height of each of the groove bottoms 12b and 14b from the recessed portion region which is a groove lower end is preferably 3 mm or smaller, for example, from a viewpoint of forming the sufficient face of the groove wall 12f or 14f and improving the driving stability on the wet road. Groove walls of the recessed portion region may be in wave shapes or in straight shapes. In the case where the groove walls are in wave shapes, cycle lengths of the waves may be the same as or smaller than the cycles lengths 12p' and 14p' of the waves at the groove bottoms 12b and 14b. Both the wave-shaped circumferential grooves 12 and 14 are formed in the half tread portion 10a and the tread pattern 10 is asymmetric from a viewpoint of improving the tire noise performance.

A straight circumferential groove 16 extends straightly in the tire circumferential direction. The straight circumferential groove 16 has a constant groove width, e.g., 10 mm, in the tire circumferential direction. A groove depth of the straight circumferential groove 16 is 8 mm, for example. Faces of groove walls of the straight circumferential groove 16 have chamfered portions 16c extending in the tire circumferential direction at the tread surface. The faces of the groove walls are inclined outward at 0 to 40° with reference to the tire radial direction.

(First Land Portion)

The first land portion 22 is a continuously extending land portion formed between a pattern end 18a and the wave-shaped circumferential groove 12 in the tire width direction and extending in the tire circumferential direction. A contact end of the tire contact surface with the ground is positioned on the land portion 22. In the first land portion 22, a first lug groove 23 is provided in each pitch and the plurality of first lug grooves 23 are arranged in the tire circumferential direction.

The first lug groove 23 extends from a vicinity of the pattern end 18a toward the wave-shaped circumferential groove 12 in the tire width direction and is closed without communicating with the wave-shaped circumferential groove 12. The first lug groove 23 has a portion 23a extending in the tire circumferential direction on the pattern end 18a side.

The first land portion 24 is a continuously extending land portion formed between the pattern end 20a and the straight circumferential groove 16 in the tire width direction and extending in the tire circumferential direction. In the first land portion 24, a first lug groove 25 and a third lug groove 27 are provided in each pitch and the plurality of first lug grooves 25 and third lug grooves 27 are arranged in the tire circumferential direction.

The first lug groove 25 extends from a vicinity of the pattern end 20a toward the straight circumferential groove 16 in the tire width direction and is closed without communicating with the straight circumferential groove 16. The first lug groove 25 has a portion 25a extending in the tire width direction and a curve portion 25b formed to curve from the portion 25a toward the tire circumferential direction. The curve portion 25b preferably has a bottom raising portion having a smaller groove depth than the portion 25a from a viewpoint of suppression of the tire wear. The bottom raising portion has a depth of 0.5 mm, for example. Furthermore, the first lug groove 25 has a portion 25d extending in the tire circumferential direction on the pattern end 20a side and communicates with the portion 25a.

The third lug groove 27 is provided to extend from the straight circumferential groove 16 toward the first lug groove 25 side. The third lug groove 27 has a portion 27a extending in the tire width direction and opening into the straight circumferential groove 16 and a portion 27b communicating with the portion 27a and extending in the tire circumferential direction. At a portion of the first land portion 24 where the portion 27a of the third lug groove 27 forms an acute angle with respect to the straight circumferential groove 16, a chamfer 27d is formed by chamfering at the tread surface.

(Second Land Portion)

The second land portion 26 is a continuously extending land portion formed between two wave-shaped circumferential grooves 12 and 14 in the tire width direction and extending in the tire circumferential direction.

The second land portion 28 is a continuously extending land portion formed between the wave-shaped circumferential groove 14 and the straight circumferential groove 16 in the tire width direction and extending in the tire circumferential direction. The center line CL is positioned on the land portion 28. In the second land portion 28, a second lug groove 31 opening into the wave-shaped circumferential groove 14 is provided in each pitch in the circumferential direction and the plurality of second lug grooves 31 are arranged in the tire circumferential direction. The second lug grooves 31 make new flows of air in the contact face to thereby avoid promotion of generation of the air cavity resonance in the wave-shaped circumferential groove 14. An end portion of the second lug groove 31 on a side of the straight circumferential groove 16 is closed without communicating with the straight circumferential groove 16. In this way, it is possible to reduce the tire noise caused by the pattern noise.

In the groove wall 14f of the wave-shaped circumferential groove 14, an opening portion 310 of the second lug groove 31 is formed. A tire circumferential width 31ow of the opening portion 310 at the tread surface is preferably 5% a length or greater between second lug grooves 31, 31 which are adjacent respectively in the tire circumferential direction, further preferably 7% or greater, and best preferably 10% from a viewpoint of the effect of suppressing the noise due to the air cavity resonance. The tire circumferential width 31ow is preferably 15% the length or smaller between the second lug grooves 31, 31 which are adjacent respectively in the tire circumferential direction, further preferably 13% or smaller, and best preferably 10% from a viewpoint of reducing the tire noise without increasing the pattern noise. The length between the second lug grooves 31, 31 is represented as subtraction of the width 31ow of the opening portion 310 from the cycle length 14p of the wave-shaped circumferential groove 14 at the tread surface. The width 31ow of the opening portion 31o is 1.5 to 4.5 mm, for example, when the length between the second lug grooves 31, 31 is 30 mm. A groove depth of the opening portion 31o of the second lug groove 31 is preferably smaller than 75% of the groove depth of the wave-shaped circumferential groove 14 from a viewpoint of increasing the block rigidity of the tread and improving the driving stability on the wet road. A portion of the second land portion 28 where the opening portion 31o of the second lug groove 31 is positioned has a chamfer 31c formed by chamfering at the tread surface.

In the second land portion 28, a notch portion 28a formed by notching a portion adjacent to the straight circumferential groove 16 is provided in each pitch and a plurality of notch portions 28a are arranged in the tire circumferential direction. The notch portions 28a are provided in tire circumferential positions facing the positions of the chamfers 27d across the straight circumferential groove 16.

In the tread pattern 10, a groove area ratio which is a ratio of an entire groove area to an entire tread surface when the tire is new is preferably 23 to 35% from a viewpoint of increasing the edge components to improve the driving stability on the wet road when the tire is worn and is 27 to 30%, for example. Although the tire noise tends to increase as the groove area ratio of the tread pattern increases in general, the above-described structures of the wave-shaped circumferential grooves 12 and 14 effectively suppress the noise even for a relatively high groove area ratio of the tire for the passenger car.

In the above-described tread pattern 10, the wave-shaped circumferential grooves may not be provided with the see-through portions and the chamfered portions. For the two wave-shaped circumferential grooves, the cycles of the waves at the tread surface and at the groove bottoms may not be synchronous with each other in the tire circumferential direction. The two wave-shaped circumferential grooves may be different from each other not only in the cycles of the waves at the tread surface and at the groove bottom but also in the groove widths and the groove depths at the tread surface and at the groove bottom and dimensions of the see-through portion and the chamfered portions.

In the tread pattern of the embodiment, at least one wave-shaped circumferential groove may be provided and one or three or more wave-shaped circumferential grooves may be provided. If a plurality of circumferential grooves are provided, they may be the same or different in the groove width at the tread surface. If three or more circumferential grooves are provided and at least one of them is a straight circumferential groove, the straight groove may be provided on an outermost side in the tire width direction or on an inner side next to the outermost side where a circumferential groove is provided. The first lug grooves may be provided not to both of the opposite shoulder regions but in only one of the shoulder regions. The second land portions may be the land portions in which the second lug grooves communicate with the circumferential grooves and which are not extending continuously in the tire circumferential direction.

In the tread pattern of the embodiment, the wave-shaped circumferential grooves are preferably provided on the tire center line CL or away from the tire center line CL within the region 80% width from the tire center line CL to each of the pattern ends in the tire width direction. As long as the wave-shaped circumferential grooves are provided in this region, positions in the tire width direction where the wave-shaped circumferential grooves are provided are not especially limited. For example, a wave-shaped circumferential groove may be provided on the tire center line CL.

In the tread pattern of the embodiment, the sipes may be provided in the first land portions and/or the second land portions. If the sipes are provided in the first land portions, each of them is formed between the two first lug grooves adjacent to each other in the tire circumferential direction, for example. In this case, the sipes may communicate with a neighbor circumferential groove or may be closed without communicating it. If the sipes are closed without communicating the circumferential groove, an end portion of each of the sipes on the circumferential groove side has a bottom horizontal portion and a bottom raising portion. The bottom horizontal portion keeps a constant depth and the bottom raising portion bends itself at a bottom thereof to raise the bottom of the ripe as compared with the bottom horizontal portion. The depth of the bottom raising portion is 0.5 mm, for example.

If the sipes are provided in the second land portions, they may communicate with the two circumferential grooves adjacent to each other across each of the second land portions. In this case, widths of the sipes are preferably arranged such that the sipes can close and the second land portions can form rib shapes continuously extending in the tire circumferential direction when the sipes and the second land portions are brought into contact with the ground. The widths are smaller than 1.5 mm, for example, from a viewpoint of improving the tire noise performance. Directions in which the sipes extend are not especially limited. The number of sipes is not especially limited and may be modified according to the size of the tire.

The tire 1 having the tread pattern of the embodiment may be provided with one or more dimples. Each of the dimples may be provided between the two adjacent first lug grooves in the tire circumferential direction in a region inside the pattern end and outside the contact end, for example. In this case, the dimples may be provided on the outer side(s) of any of or both of the half tread portions 10a and 10b. For example, one or more dimples are provided in each pitch.

Here, the contact ends are defined as follows. The contact ends are end portions of the contact surface in the tire width direction when the tire 10 is mounted to a standard rim, filled with normal internal pressure of 180 (kPa), a load is set to 88% of a normal load, and the tire is brought into contact with a horizontal face. The standard rim is a "standard rim" defined by JATMA standards, a "Design Rim" defined by TRA standards, or a "Measuring Rim" defined by ETRTO standards. The normal internal pressure is the "maximum air pressure" defined by JATMA, the maximum value of "TIRE LOAD LIMITS AT VARIOUS COLD INFLATION PRESSURES" defined by TRA standards, or "INFLATION PRESSURES" defined by ETRTO standards. For the passenger car tires, the normal internal pressure is 180 (kPa). The normal load is the "maximum load capacity" defined by JATMA standards, the maximum value of "TIRE LOAD LIMITS AT VARIOUS COLD INFLATION PRESSURES" defined by TRA standards, or "LOAD CAPACITY" defined by ETRTO standards. In the tread pattern of the embodiment, the rotating direction is not required for the tire.

EXAMPLES

To study effects of this tread pattern 10 of the tire 1, tires were produced experimentally. Tire size was 196/65R15. Rim size was 15×6.0 J. The tires having tread patterns including circumferential grooves and lug grooves of dimensions illustrated in the following Tables 1 to 6 indicated in FIGS. 10A to 15D were produced. As a vehicle used for studying tire performance, a sedan type passenger car of a 2-liter engine displacement was used. Internal pressure was 210 (kPa) for the tires of front wheels and rear wheels.

In the Tables 1 to 6 indicated in FIGS. 10A to 15D, columns, "Groove center position from CL" is expressed as a distances between the tire center line CL and center positions of the respective circumferential grooves. For the groove positioned on the inner side of the vehicle when the tire is mounted, the distance is added as a negative sign, while for the groove positioned on the outer side of the vehicle, the distance is added as a positive sign. For the groove center position, the distance of the center position of the groove in the tire width direction is used. For the wave-shaped circumferential groove, the center position of the groove in the tire width direction is on a center portion of the wave-shaped groove. "Surface shape" and "Groove bottom shape" refer to shapes of the groove at the tread surface and at e groove bottom, respectively. "Initial wave cycle length" and "Groove bottom wave cycle length" refer to cycle lengths of waves at the tread surface and at the groove bottom, respectively, of each of the circumferential grooves when the tire is new and each cycle length refers to an average circumferential length obtained by dividing a tire circumference length of the experimentally produced tire by the number of waves.

In the experimentally produced tires, the groove widths of the circumferential grooves 12, 14, and 16 at the groove bottoms were 7 mm. Lengths between the second lug grooves were 30 mm.

As the tire performance of the experimentally produced tires, wet performance and tire noise performance were evaluated after the tires were worn. As the tire noise performance, exterior noise of the vehicle to be evaluated was measured by the ISO test method. A vehicle pass-by noise on a dry road condition was measured in a tire test site at a traveling speed of 80 km/hour and expressed as indexes for the tire noise performance with respect to the vehicle pass-by noise in the case where a tire of a related-art example 1 was used. The negative index indicates that the performance is on a higher level than that in the related-art example 1 and the positive index indicates that the performance is on a lower level than that in the related-art example 1. When the plurality of the measured vehicle pass-by noises are compared with each other and differences of the measured noises are within 0.3 dB, there is no practical difference.

As the wet performance after the tire is worn, the vehicle was driven, at a maximum speed, five times on a R30 cornering wet road with a water film having depth of 1 mm of an outdoor tire test site, using the tires whose tread surfaces have the groove bottoms of the respective circumferential grooves appeared. An average lateral acceleration at this time was calculated from the maximum speed and expressed as an index for the driving stability on the wet road. The higher the index, the more the tire is excellent in the wet performance.

As is clear from the Table 1 indicated in FIGS. 10A to 10D, if the cycle lengths of the waves of the wave-shaped circumferential groove at the tread surface were the same as the cycle lengths of the waves at the groove bottoms (related-art example 1), the noise performance and the wet performance were not as compatibly improved with each other as in examples 1 to 38 (see the following Tables 2 to 6 indicated in FIGS. 11A to 15D), even if all of the circumferential grooves were in wave shapes.

When either the shape of the circumferential groove at the tread surface or the groove bottom was not the wave shape, the wet performance did not improve in a case of related-art example 2 where the circumferential groove at the groove bottom was not formed in the wave shape. In a case of related-art example 3 where the circumferential groove at the tread surface was not formed in the wave shape, the noise performance did not improve.

Figure 16:
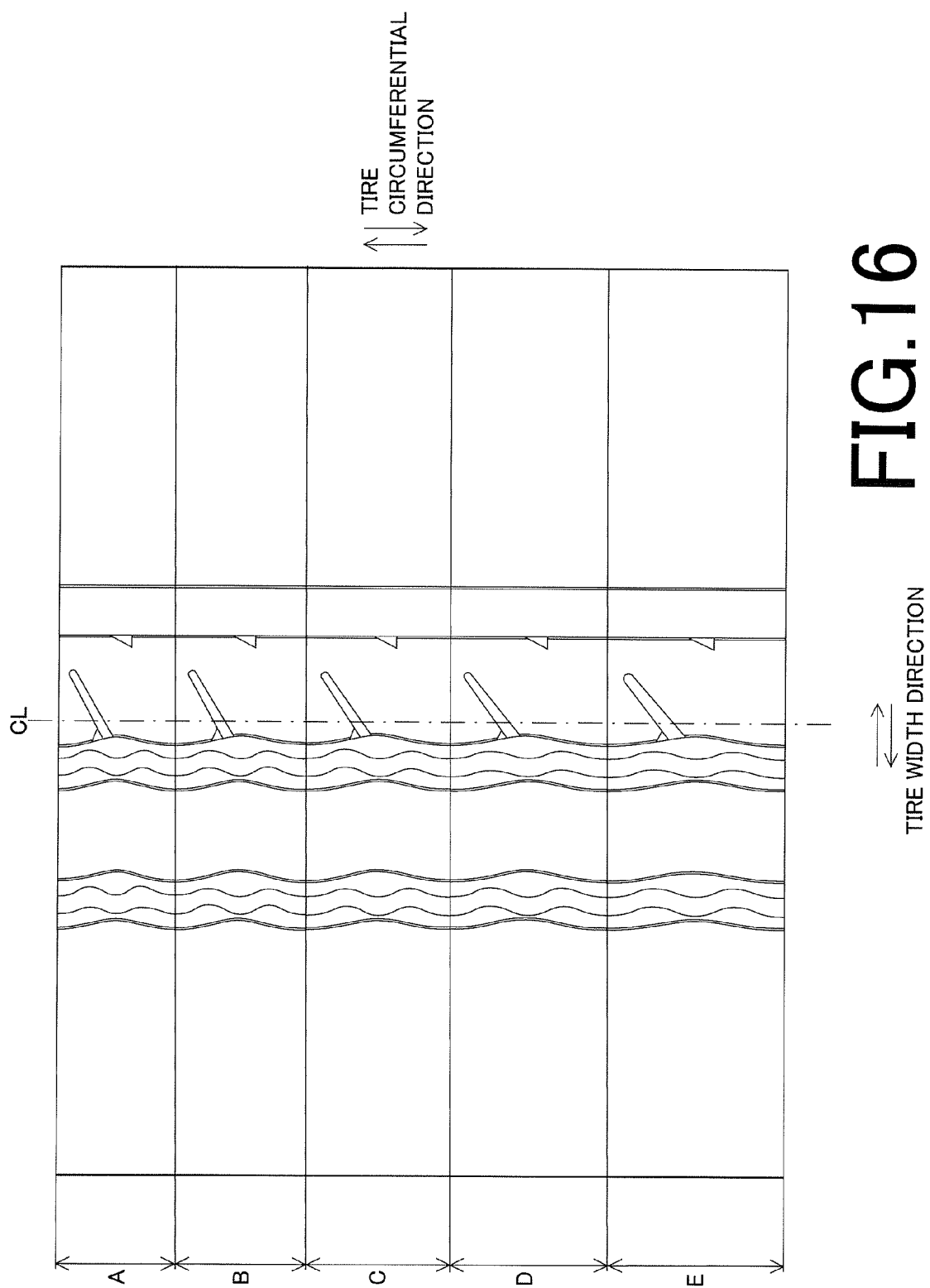
FIG. 16 is a reference drawing illustrating a tread pattern used for a tire of a comparative example 1.

In a case of comparative example 1 where the tread pattern did not include the first lug grooves in the shoulder regions as illustrated in FIG. 16, the noise performance improved while the wet performance reduced. The tread pattern illustrated in FIG. 16 does not have the first lug grooves in the first land portions and the groove area ratio was 20%.

In a case of comparative example 2 where the first lug grooves were communicating with the circumferential groove, the wet performance improved while the noise performance reduced in contrast to the comparative example 1. In a case of comparative example 3 where the groove width of the wave-shaped circumferential groove was not constant, the wet performance reduced. In a case of comparative example 4 where the circumferential groove was not in the wave shape, both the noise performance and the wet performance reduced.

On the other hand, it was confirmed that the noise performance and the wet performance are improved compatibly with each other at high levels in the examples 1 to 38. Each example includes the first lug grooves not communicating with the circumferential grooves in the shoulder regions and at least one circumferential groove with the constant groove width which is in the wave shape at both of the tread surface and at the groove bottom, which has the constant groove width. The cycle length of the waves at the groove bottom is shorter than the cycle of the waves at the tread surface.

As can be appreciated from the above, the pneumatic tire 1 is provided with a tread pattern including a plurality of circumferential grooves extending continuously in a tire circumferential direction and a first land portion that is formed between a pattern end and one of the circumferential grooves and extends in the tire circumferential direction in a shoulder region outside the circumferential grooves in a tire width direction. Although the pneumatic tire 1 of the disclosed embodiment has been described in detail, it is needless to say that the invention is not limited to the above embodiment and can be improved or changed in various ways without departing from the gist of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire provided with a tread pattern, comprising:
   a plurality of circumferential grooves extending continuously in a tire circumferential direction; and
   a first land portion formed between a pattern end and one of the circumferential grooves in a shoulder region which is located outside the circumferential grooves in a tire width direction;
   the first land portion extending in the tire circumferential direction and including a plurality of first lug grooves arranged in the tire circumferential direction, the first lug grooves extending from the pattern end in the tire width direction and being closed without communicating with the circumferential grooves; and
   at least one of the circumferential grooves being a wave-shaped circumferential groove having a constant groove width in the tire width direction at a tread surface, the wave-shaped circumferential groove being formed in wave shapes in the tire circumferential direction at the tread surface and at a groove bottom, and the wave-shaped circumferential groove having a shorter cycle length of waves at the groove bottom than a cycle length of waves at the tread surface when the tire is new.

2. The pneumatic tire according to claim 1, wherein
the cycle length of the waves at the groove bottom of the wave-shaped circumferential groove ranges from 0.2 to 0.8 times the cycle length of the waves at the tread surface.

3. The pneumatic tire according to claim 2, wherein
the wave-shaped circumferential groove includes a see-through portion that extends along a plane in the tire circumferential direction and through which a portion of the wave-shaped circumferential groove is visible from a location in the wave-shaped circumferential groove that is at a circumferential distance from the portion along the tire circumferential direction; and
a width of the see-through portion at the groove bottom of the wave-shaped circumferential groove ranges from 20 to 80% of the groove width of the wave-shaped circumferential groove at the groove bottom.

4. The pneumatic tire according to claim 2, wherein
the cycle of the waves at the tread surface of the wave-shaped circumferential groove ranges from 1.2 to 1.7% of a tire circumference length of the pneumatic tire.

5. The pneumatic tire according to claim 2, wherein
the wave-shaped circumferential groove has a groove depth ranging from 6 to 12 mm and an amplitude in the tire width direction at the tread surface ranging from 10 to 20% of the groove width at the tread surface.

6. The pneumatic tire according to claim 2, further comprising
a second land portion including a plurality of second lug grooves opening into the wave-shaped circumferential groove and arranged in the tire circumferential direction; and
widths of respective opening portions of the second lug grooves range from 5 to 15% of a length between adjacent ones of the second lug grooves.

7. The pneumatic tire according to claim 2, wherein
the wave-shaped circumferential groove includes groove walls having chamfered portions formed by chamfering at the tread surface; and
the chamfered portions have depths ranging from 5 to 15% of the depth of the circumferential groove and widths ranging from 3 to 15% of the groove width of the circumferential groove at the tread surface.

8. The pneumatic tire according to claim 2, wherein
the wave-shaped circumferential groove is located in a half tread portion on one side of the pneumatic tire with respect to a tire center line of the pneumatic tire; and
the half tread portion faces an inner side of a vehicle when the pneumatic tire is mounted to the vehicle.

9. The pneumatic tire according to claim 2, further comprising
at least two main grooves extending in the tire circumferential direction; and
each of the main grooves is configured as the wave-shaped circumferential groove, the main grooves are located in a half tread portion on one side of the pneumatic tire with respect to a tire center line, and the half tread portion faces an inner side of a vehicle when the tire is mounted to the vehicle.

10. The pneumatic tire according to claim 2, further comprising
at least two main grooves extending in the tire circumferential direction, each of the main grooves being configured as the wave-shaped circumferential groove; and
a second land portion extending in the tire circumferential direction, the second land portion including a plurality of second lug grooves disposed in the tire circumferential direction, each of the second lug grooves opening to one of the wave-shaped circumferential grooves at one end thereof and closed at an other end thereof.

11. The pneumatic tire according to claim 1, wherein
the wave-shaped circumferential groove includes a see-through portion that extends along a plane in the tire circumferential direction and through which a portion of the wave-shaped circumferential groove is visible from a location in the wave-shaped circumferential groove that is at a circumferential distance from the portion along the tire circumferential direction; and
a width of the see-through portion at the groove bottom of the wave-shaped circumferential groove ranges from 20 to 80% of the groove width of the wave-shaped circumferential groove at the groove bottom.

12. The pneumatic tire according to claim 11, wherein
the cycle of the waves at the tread surface of the wave-shaped circumferential groove ranges from 1.2 to 1.7% of a tire circumference length of the pneumatic tire.

13. The pneumatic tire according to claim 1, wherein
the cycle of the waves at the tread surface of the wave-shaped circumferential groove ranges from 1.2 to 1.7% of a tire circumference length of the pneumatic tire.

14. The pneumatic tire according to claim 1, wherein
the wave-shaped circumferential groove has a groove depth ranging from 6 to 12 mm and an amplitude in the tire width direction at the tread surface ranging from 10 to 20% of the groove width at the tread surface.

15. The pneumatic tire according to claim 1, wherein
the plurality of circumferential grooves includes a second circumferential groove when the wave-shaped circumferential groove is referred to as a first circumferential groove;
the second circumferential groove being a wave-shaped circumferential groove having a constant groove width in the tire width direction at the tread surface, the second circumferential groove being formed in wave shapes in the tire circumferential direction at the tread surface and at the groove bottom, and the second circumferential groove having a shorter cycle length of waves at the groove bottom than a cycle length of waves at the tread surface when the tire is new;
a second land portion includes a plurality of second lug grooves opening into the second circumferential groove and arranged in the tire circumferential direction; and
widths of respective opening portions of the second lug grooves range from 5 to 15% of a length between adjacent ones of the second lug grooves.

16. The pneumatic tire according to claim 1, wherein
the wave-shaped circumferential groove includes groove walls having chamfered portions formed by chamfering at the tread surface; and
the chamfered portions have depths ranging from 5 to 15% of the depth of the circumferential groove and widths ranging from 3 to 15% of the groove width of the circumferential groove at the tread surface.

17. The pneumatic tire according to claim 1, wherein
the wave-shaped circumferential groove is located in a half tread portion on one side of the pneumatic tire with respect to a tire center line of the pneumatic tire; and
the half tread portion faces an inner side of a vehicle when the pneumatic tire is mounted to the vehicle.

18. The pneumatic tire according to claim 1, further comprising
at least two main grooves extending in the tire circumferential direction; and
each of the main grooves is configured as the wave-shaped circumferential groove, the main grooves are located in a half tread portion on one side of the pneumatic tire with respect to a tire center line, and the half tread portion faces an inner side of a vehicle when the tire is mounted to the vehicle.

19. The pneumatic tire according to claim 1, wherein
the plurality of circumferential grooves includes a second circumferential groove when the wave-shaped circumferential groove is referred to as a first circumferential groove;
the second circumferential groove being a wave-shaped circumferential groove having a constant groove width in the tire width direction at the tread surface, the second circumferential groove being formed in wave shapes in the tire circumferential direction at the tread surface and at the groove bottom, and the second circumferential groove having a shorter cycle length of waves at the groove bottom than a cycle length of waves at the tread surface when the tire is new; and
a second land portion is located between two adjacent of the first circumferential groove and the second circumferential groove and is extending in the tire circumferential direction, the second land portion including a plurality of second lug grooves disposed in the tire circumferential direction, each of the second lug grooves opening to the second circumferential groove at one end thereof and closed at an other end thereof.

20. The pneumatic tire according to claim 1, further comprising
a pair of sidewalls and a tread portion disposed between the sidewalls, the tread portion including the tread surface and the plurality of circumferential grooves.

21. The pneumatic tire according to claim 1, wherein
the wave-shaped circumferential groove includes groove walls having chamfered portions formed by chamfering at the tread surface; and
the groove walls are formed by extending, in the tire circumferential direction, a line segment formed between a lower end of the chamfered portion and the groove bottom at a tire circumferential position identical to the lower end.

22. The pneumatic tire according to claim 1, wherein
the wave-shaped circumferential groove has the constant groove width in the tire width direction at the tread surface and at a groove bottom.

* * * * *